（12）United States Patent
Krysiak et al.

(10) Patent No.: US 10,737,145 B2
(45) Date of Patent: *Aug. 11, 2020

(54) GAME BALL HAVING A REDUCED MOMENT OF INERTIA

(71) Applicant: WILSON SPORTING GOODS CO., Chicago, IL (US)

(72) Inventors: Kevin L. Krysiak, Palatine, IL (US); Jonathan L. Bauer, Chicago, CA (US); Frank M. Simonutti, Wheaton, IL (US); Daniel E. Hare, Schaumburg, IL (US); Robert T. Thurman, Plainfield, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,913

(22) Filed: Jul. 17, 2018

(65) Prior Publication Data

US 2018/0318655 A1 Nov. 8, 2018

Related U.S. Application Data

(63) Continuation of application No. 14/982,195, filed on Dec. 29, 2015, now Pat. No. 10,022,593, which is a
(Continued)

(51) Int. Cl.
*A63B 41/08* (2006.01)
*A63B 41/02* (2006.01)
(Continued)

(52) U.S. Cl.
CPC .............. *A63B 41/08* (2013.01); *A63B 41/02* (2013.01); *A63B 43/00* (2013.01); *A63B 43/06* (2013.01); *A63B 45/00* (2013.01); *A63B 71/0622* (2013.01); *G09B 19/0038* (2013.01); *A63B 41/00* (2013.01); *A63B 41/10* (2013.01); *A63B 2041/005* (2013.01); *A63B 2071/0625* (2013.01); *A63B 2220/12* (2013.01); *A63B 2220/20* (2013.01); *A63B 2220/30* (2013.01);
(Continued)

(58) Field of Classification Search
CPC ......... A63B 41/00; A63B 41/02; A63B 41/08; A63B 41/10; A63B 45/00
USPC ................................ 473/593, 599, 604, 605
See application file for complete search history.

(56) References Cited

U.S. PATENT DOCUMENTS 5,681,233 A 10/1997 Guenther et al.
5,883,569 A * 3/1999 Kolefas .................... A43B 3/00
273/372
(Continued)

*Primary Examiner* — Chase E Leichliter
(74) *Attorney, Agent, or Firm* — Terence P. O'Brien

(57) ABSTRACT

A game ball configured for organized, competitive play and having a total mass. The game ball includes an inflatable bladder, a layer of reinforcing material surrounding the bladder, an elastomeric layer surrounding the bladder, and a plurality of cover panels positioned over the layer of reinforcing material and the elastomeric layer. The bladder has a bladder mass that is greater than 25 percent of the total mass. The elastomeric layer and the layer of reinforcing material have a collective mass that is less than 55 percent of the total mass. The game ball is formed without one or more of electronics, batteries and charging coils.

20 Claims, 13 Drawing Sheets

Related U.S. Application Data continuation-in-part of application No. 14/212,932, filed on Mar. 14, 2014, now Pat. No. 10,449,421, which is a continuation-in-part of application No. 14/071,384, filed on Nov. 4, 2013, now Pat. No. 9,656,140.

(60) Provisional application No. 61/798,738, filed on Mar. 15, 2013, provisional application No. 61/788,304, filed on Mar. 15, 2013, provisional application No. 61/799,851, filed on Mar. 15, 2013, provisional application No. 61/800,972, filed on Mar. 15, 2013, provisional application No. 61/891,497, filed on Oct. 16, 2013, provisional application No. 61/724,668, filed on Nov. 9, 2012.

(51) Int. Cl.
*A63B 45/00* (2006.01)
*A63B 71/06* (2006.01)
*A63B 43/00* (2006.01)
*A63B 43/06* (2006.01)
*G09B 19/00* (2006.01)
*A63B 41/00* (2006.01)
*A63B 41/10* (2006.01)

(52) U.S. Cl.
CPC ....... *A63B 2220/35* (2013.01); *A63B 2220/40* (2013.01); *A63B 2220/56* (2013.01); *A63B 2220/62* (2013.01); *A63B 2220/72* (2013.01); *A63B 2220/89* (2013.01); *A63B 2225/20* (2013.01); *A63B 2225/50* (2013.01); *A63B 2225/54* (2013.01); *A63B 2243/0037* (2013.01)

(56) References Cited

U.S. PATENT DOCUMENTS

| | | | |
|---|---|---|---|
| 5,931,752 A | 8/1999 | Guenther et al. | |
| 6,024,661 A | 2/2000 | Guenther et al. | |
| 6,123,633 A | 9/2000 | Guenther et al. | |
| 6,645,099 B2 | 11/2003 | Gaff et al. | |
| 6,685,584 B2 | 2/2004 | Jin et al. | |
| 7,300,369 B2 | 11/2007 | Krysiak et al. | |
| 7,585,236 B2 | 9/2009 | Krysiak | |
| 7,699,727 B2 | 4/2010 | Guenther et al. | |
| 7,892,120 B2 | 2/2011 | Krysiak | |
| 7,909,715 B2 | 3/2011 | Krysiak | |
| 8,047,937 B2 | 11/2011 | Krysiak | |
| 8,142,311 B2 | 3/2012 | Krysiak | |
| 8,251,846 B2 | 8/2012 | Krysiak | |
| 8,460,136 B2 | 6/2013 | Krysiak | |
| 8,579,742 B2 | 11/2013 | Krysiak | |
| 8,740,734 B2 | 6/2014 | Krysiak | |
| 9,114,286 B2 | 8/2015 | Krysiak et al. | |
| 9,517,397 B2 | 12/2016 | Thurman et al. | |
| 9,623,311 B2 | 4/2017 | Thurman et al. | |
| 9,656,142 B2 | 5/2017 | Thurman et al. | |
| 9,656,143 B2 | 5/2017 | Thurman et al. | |
| 2001/0034279 A1* | 10/2001 | Veilleux | A63B 41/00 473/593 |
| 2003/0045383 A1* | 3/2003 | Jiminez | A63B 41/08 473/597 |
| 2005/0124445 A1* | 6/2005 | Veilleux | A63B 41/00 473/593 |
| 2006/0063622 A1* | 3/2006 | Nurnberg | A63B 41/02 473/604 |
| 2009/0286632 A1* | 11/2009 | Laliberty | A63B 41/00 473/603 |
| 2010/0130314 A1* | 5/2010 | Von Der Gruen | A63B 63/00 473/570 |
| 2010/0130315 A1* | 5/2010 | Steidle | A63B 41/02 473/570 |
| 2012/0058845 A1* | 3/2012 | Crowley | A63B 41/00 473/604 |
| 2012/0244969 A1* | 9/2012 | Binder | A63H 33/18 473/570 |
| 2014/0194232 A1 | 7/2014 | Krysiak et al. | |
| 2014/0195019 A1 | 7/2014 | Thurman et al. | |
| 2014/0195020 A1 | 7/2014 | Thurman et al. | |
| 2014/0195021 A1 | 7/2014 | Thurman et al. | |
| 2014/0195022 A1 | 7/2014 | Thurman et al. | |
| 2014/0200103 A1 | 7/2014 | Thurman et al. | |
| 2014/0200692 A1 | 7/2014 | Thurman et al. | |
| 2014/0221137 A1 | 8/2014 | Krysiak et al. | |
| 2014/0222177 A1 | 8/2014 | Thurman et al. | |
| 2014/0243122 A1* | 8/2014 | Crowley | A63B 43/06 473/570 |
| 2015/0157900 A1* | 6/2015 | Holthouse | A63B 24/0021 473/570 |
| 2015/0314170 A1 | 11/2015 | Krysiak et al. | |
| 2016/0001136 A1* | 1/2016 | King | A63B 69/0071 320/108 |
| 2016/0008660 A1 | 1/2016 | Thurman et al. | |
| 2016/0074714 A1 | 3/2016 | Krysiak et al. | |
| 2016/0346627 A1* | 12/2016 | Le | A63B 37/02 |

* cited by examiner

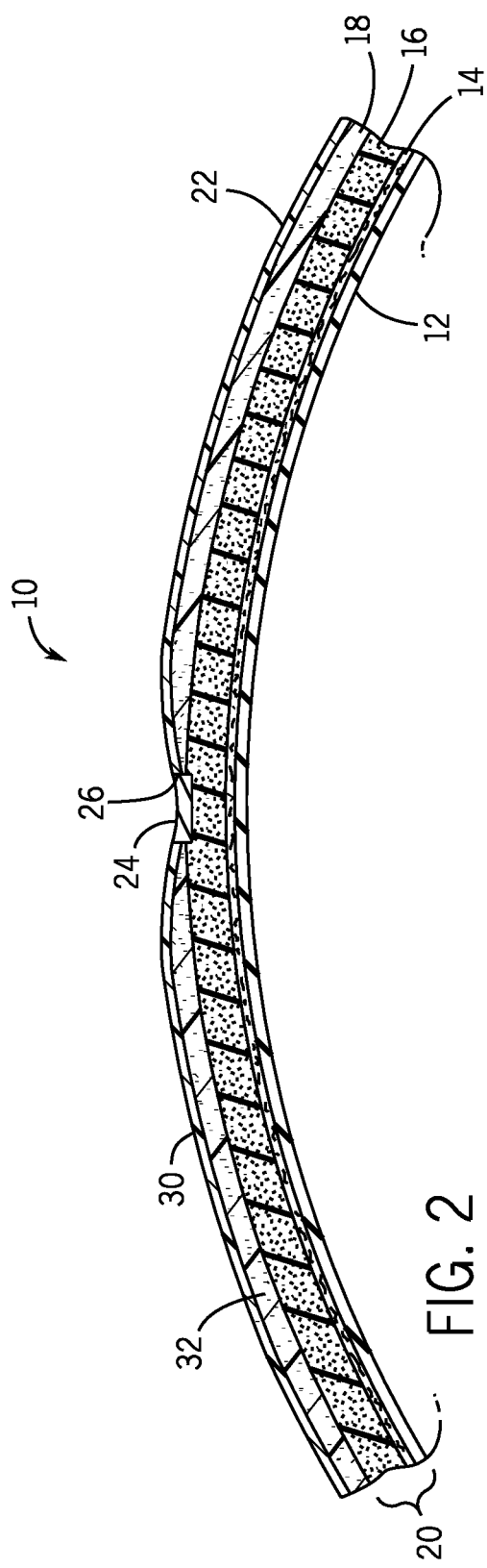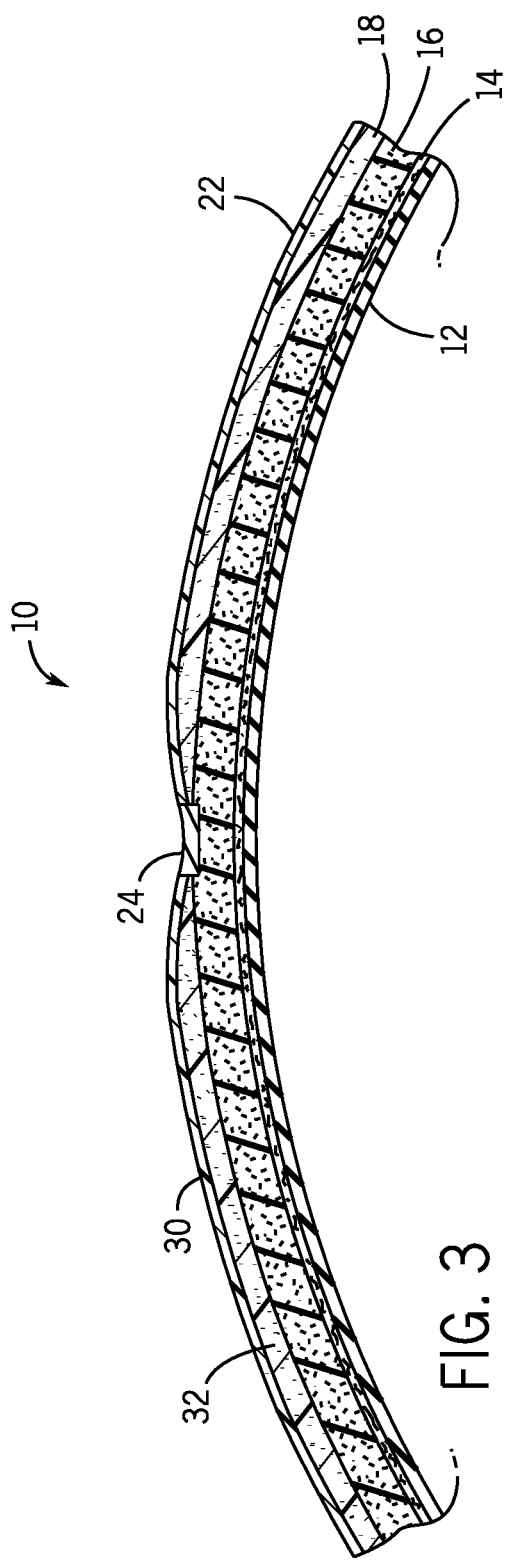

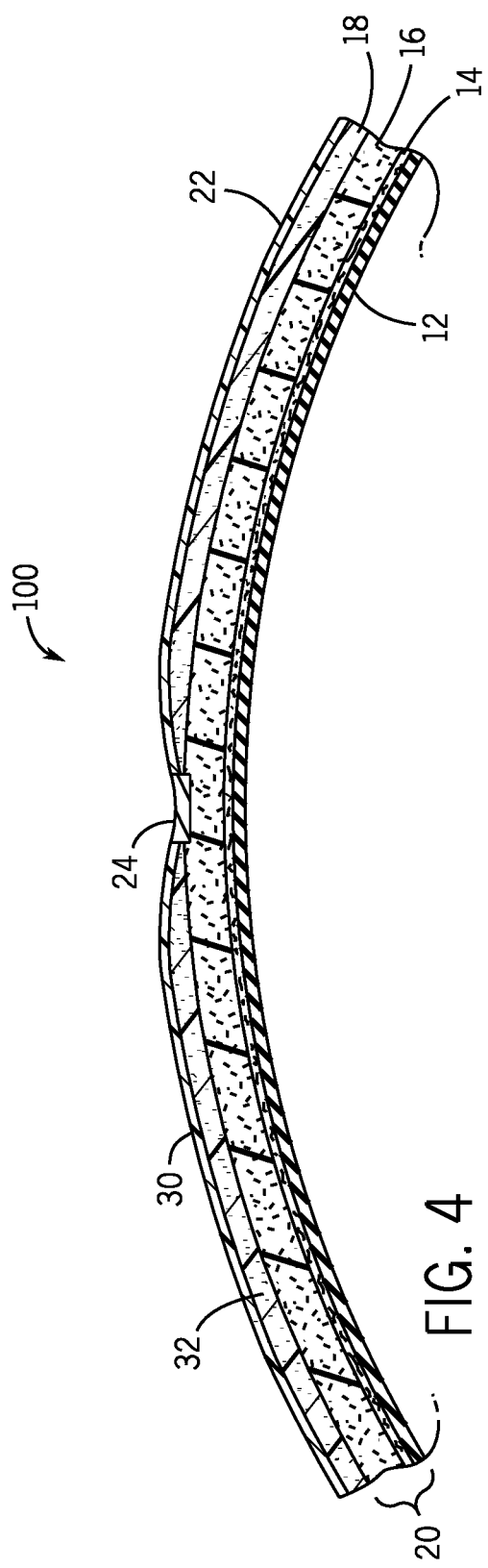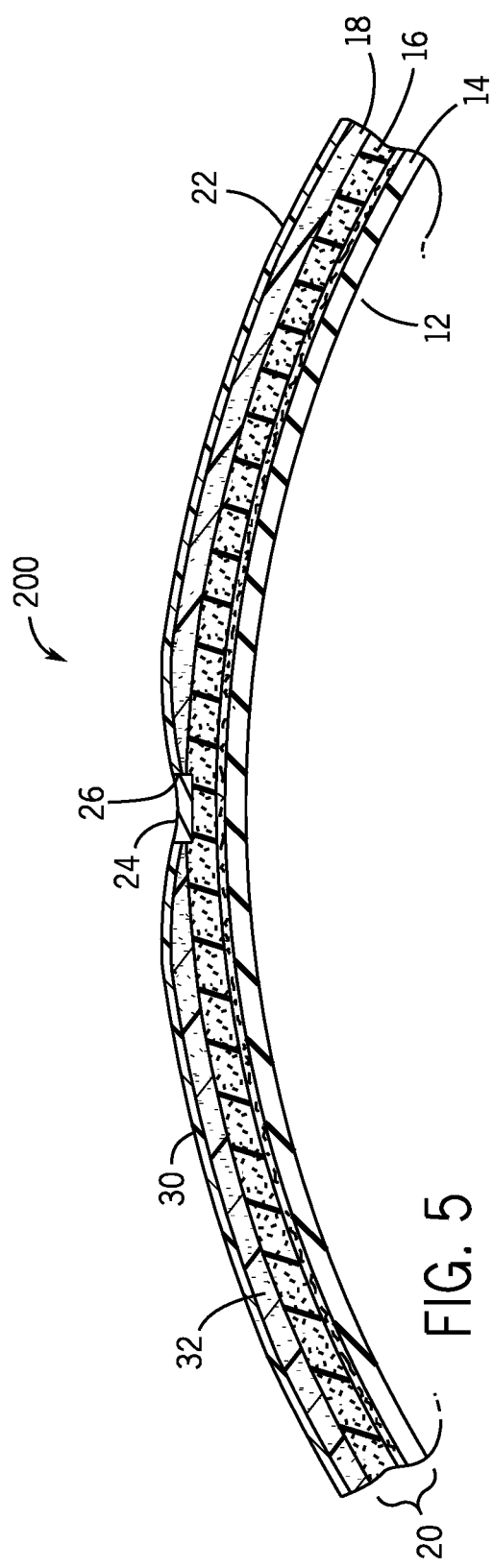

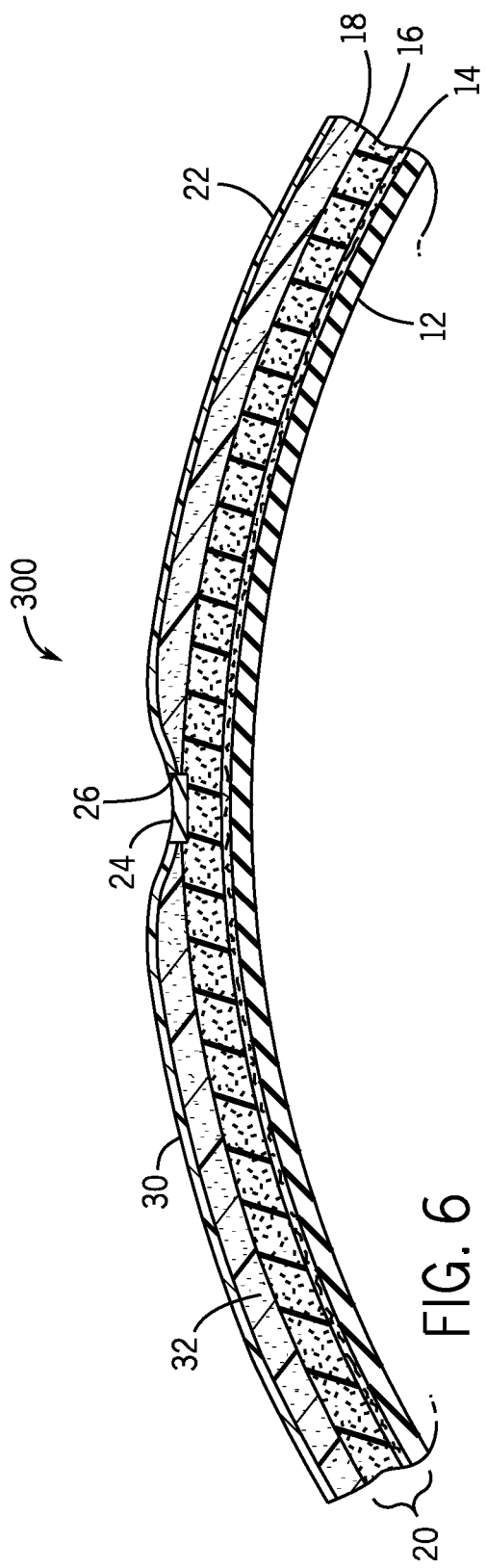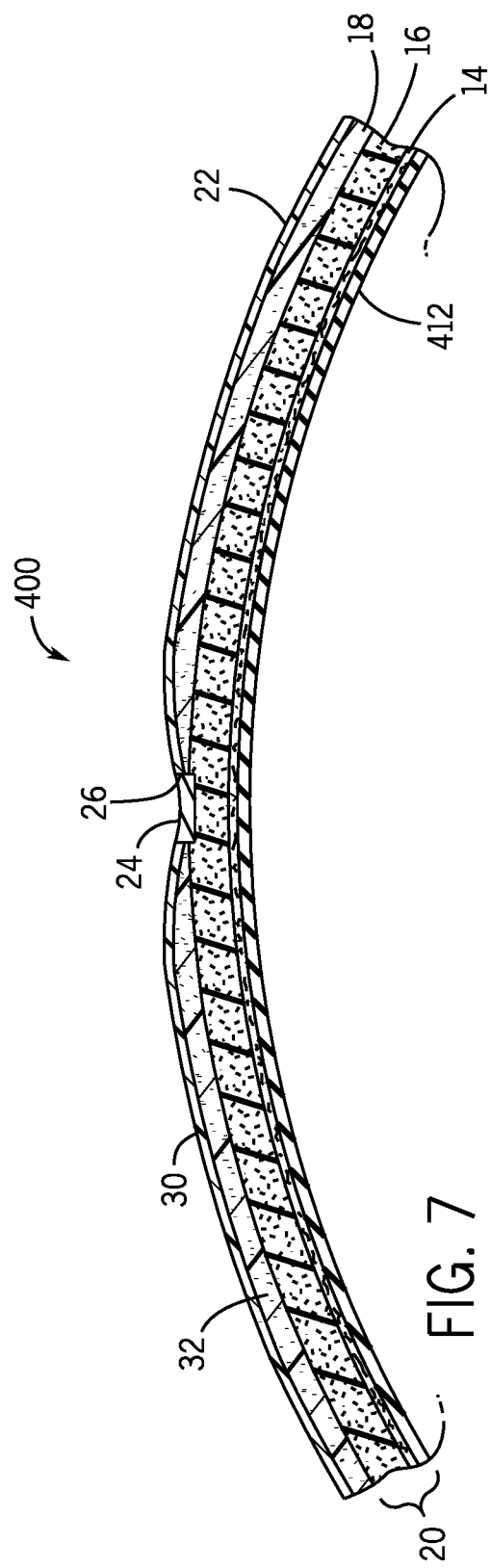

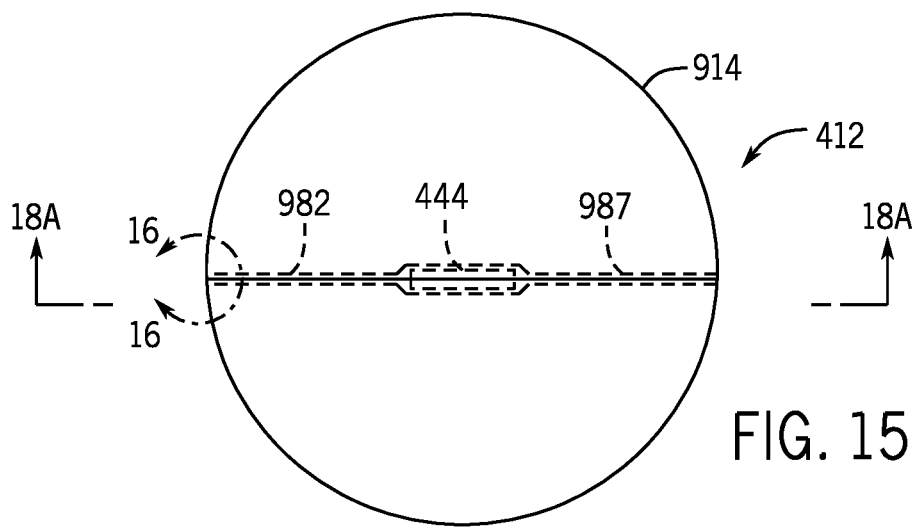
FIG. 15
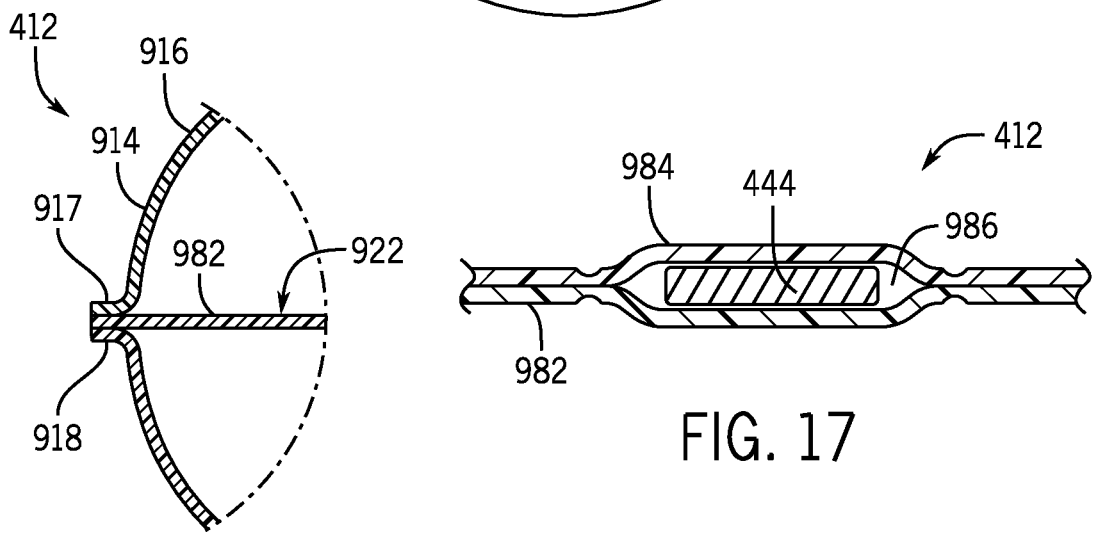
FIG. 16
FIG. 17
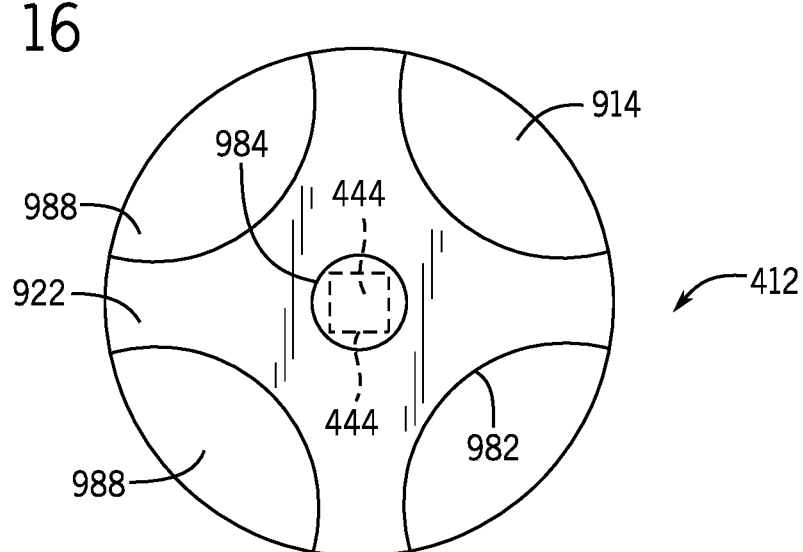
FIG. 18A

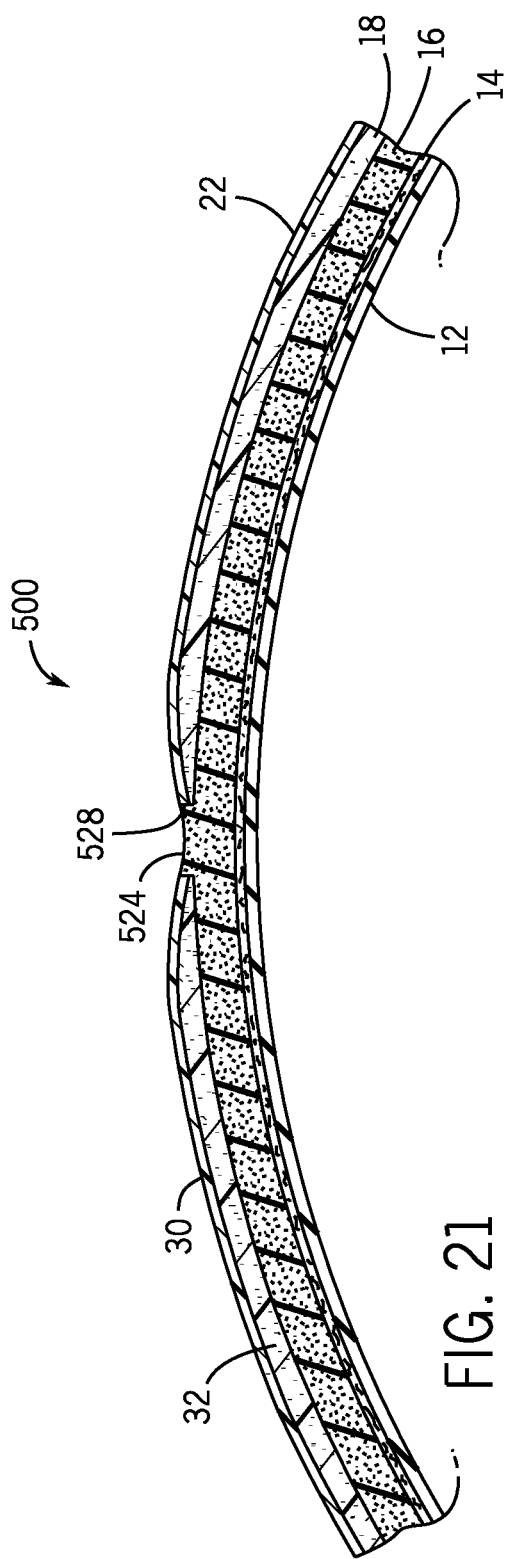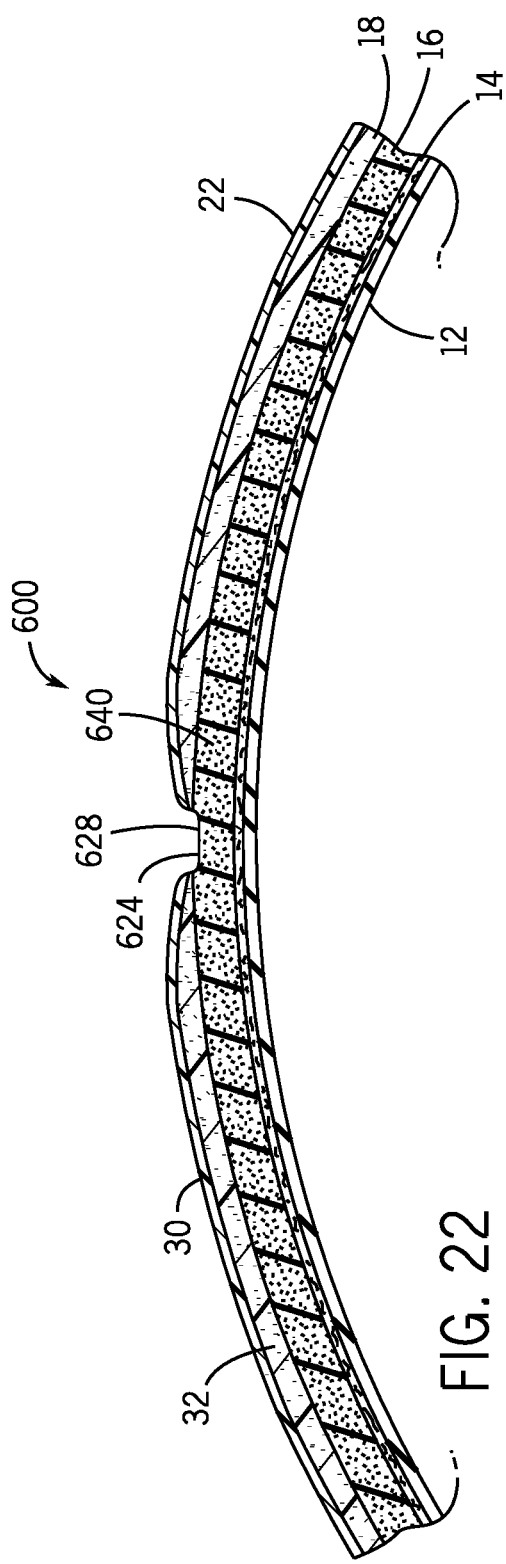

GAME BALL HAVING A REDUCED MOMENT OF INERTIA

RELATED U.S. APPLICATION DATA

The present application is a continuation of U.S. patent application Ser. No. 14/982,195 filed on Dec. 29, 2015, which is a continuation-in-part application of U.S. patent application Ser. No. 14/212,932 filed on Mar. 14, 2014, which is a continuation-in-part application of U.S. patent application Ser. No. 14/071,384, filed on Nov. 4, 2013, now U.S. Pat. No. 9,656,140, which claims the benefit of the filing date under 35 U.S.C. § 119(e) of U.S. Provisional Patent Application Ser. Nos. 61/724,668, filed on Nov. 9, 2012; 61/798,738, filed on Mar. 15, 2013; 61/788,304, filed on Mar. 15, 2013; 61/799,851, filed on Mar. 15, 2013; 61/800,972 field on Mar. 15, 2013; and 61/891,497, filed on Oct. 16, 2013, which are hereby incorporated by reference in their entirety.

FIELD OF THE INVENTION

The present invention relates generally to a basketball. In particular, the present invention relates to a basketball having an improved construction to improve the playability of the basketball.

BACKGROUND OF THE INVENTION

Basketballs are well known, and typically include an inflatable bladder covered with a layer of windings and encased in a rubber layer, and a plurality of cover panels are positioned over the rubber layer. The cover panels are commonly formed of rubber, leather, or a synthetic leather.

There is a continuing need to improve the construction of basketballs to improve a player's ability to shoot the ball and to shoot the ball at a higher shooting percentage. Basketball shots from proficient basketball players typically share at least one common attribute. Proficient basketball shooters typically place a back spin on the ball as they shoot. A basketball shot with a back spin has a higher likelihood of being a made basket than a basketball shot without back spin. A continuing need exists for a basketball that is configured to enable a player to easily impart a spin to the ball when shooting. A need also exists for a basketball that has a soft bounce of the rim thereby increasing the likelihood of a shot falling through the basketball rim upon impact with the rim and/or the backboard. What is needed is a basketball that improves the player's ability to easily grasp, handle, pass, shoot, dribble and otherwise control the ball during use without radically departing from the ball's traditional design. There is also an ever present need to improve the feel of a basketball during play.

SUMMARY OF THE INVENTION

The present invention provides a basketball configured for organized, competitive play and having a total mass. The basketball includes an inflatable, generally spherical bladder, a set of winding surrounding the bladder, an elastomeric layer surrounding the set of windings and the bladder, and a plurality of cover panels positioned over the elastomeric layer. The bladder has a bladder mass that is greater than 25 percent of the total mass. The elastomeric layer and the set of windings have a collective mass that is less than 55 percent of the total mass.

This invention will become more fully understood from the following detailed description, taken in conjunction with the accompanying drawings described herein below, and wherein like reference numerals refer to like parts.

BRIEF DESCRIPTION OF THE DRAWINGS

FIG. 2 is a sectional view of the basketball of FIG. 1 taken along line 2-2 of FIG. 1.

FIGS. 3 through 7 are sectional views of the basketball similar to the sectional view of FIG. 2, but in accordance with alternative implementations of the present invention.

FIG. 15 is a sectional view of a portion of another implementation of the basketball of FIG. 8.

FIG. 16 is a fragmentary sectional view of the ball of FIG. 15 taken along line 16-16.

FIG. 17 is an enlarged fragmentary sectional view of an internal portion of the ball of FIG. 15.

FIG. 18A is a sectional view of another example implementation of the ball of FIG. 15 taken along line 18A-18A.

FIGS. 21 and 22 are sectional views of the basketball similar to the sectional view of FIG. 2, but in accordance with alternative implementations of the present invention.

DETAILED DESCRIPTION

Figure 1:
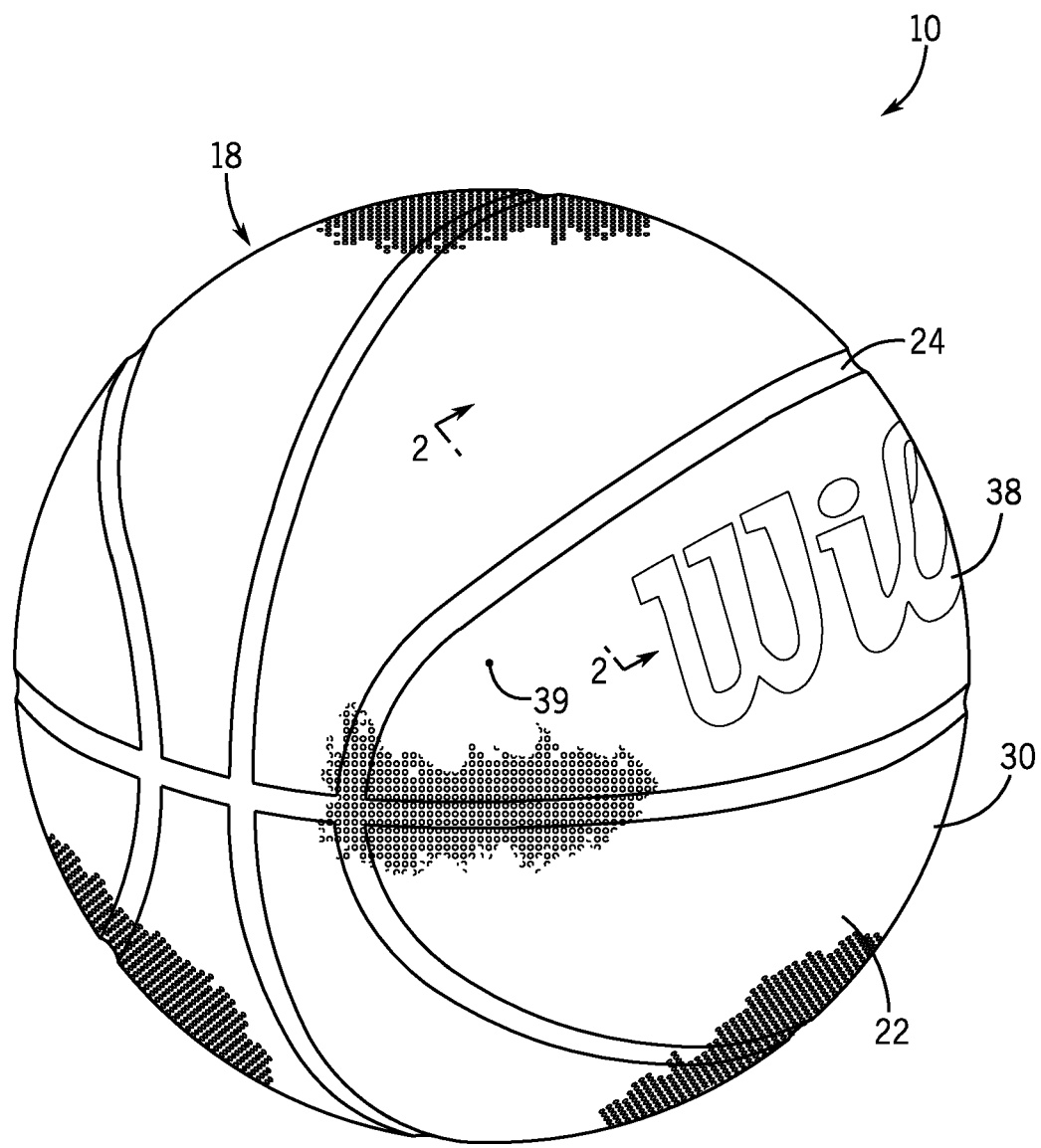
FIG. 1 is a front side perspective view of a basketball in accordance with an implementation of the present invention.

Referring to FIGS. 1 and 2 a basketball is indicated generally at 10. The basketball 10 is a generally spherical inflatable object. The present invention is applicable to basketballs in general including basketballs 10 configured for organized competitive play. One such basketball can be a size 7, game-quality basketball having a circumference of 29.5 inches and a weight within the range of 566 to 625 grams. In one implementation, the weight of a size 7 basketball is within the range of 575 to 605 grams. The basketball 10 preferably includes a bladder 12, a layer of windings 14, an elastomeric layer 16, and a cover assembly 18. The assembly of the bladder 12, the layer of windings 14 and the elastomeric layer 16 cured in a carcass-forming mold is commonly referred to as a carcass 20. In one implementation, the cover assembly 18 includes a plurality of cover panels 22 spaced apart by a set of channels 26 that include a set of strips 24.

The bladder 12 is an inflatable air tube preferably having a generally spherical shape. The bladder 12 enables the basketball 10 to retain a predetermined amount of air thereby achieving the desired air pressure within, or firmness to, the basketball 10. The bladder 12 is typically made of butyl rubber, natural rubber, latex, other elastic materials or combinations thereof. The bladder 12 includes a valve (see 470 of FIG. 8) for facilitating inflation of bladder 12. The valve is secured to the exterior of bladder 12 and comprises an inflation tube that extends into the bladder 12, windings 14, and the elastomeric layer 16. The valve is configured to allow air to enter the bladder 12 through use of an inflation needle (not shown) and, when removed, retain the air within the bladder 12. In one implementation, the bladder 12 is formed of a rubber compound having a density of 1.12 g/cm$^3$.

The layer of windings 14 includes one or more elongate reinforcing threads, which are wound around, or applied to, the inflated bladder 12. The layer of windings 14 reinforce the bladder 16 and retain the generally spherical shape of the bladder 16. In one implementation, the reinforcing thread may be further coated or covered with a viscous material, such as a latex adhesive. In one implementation, the reinforcing thread is passed through a viscous adhesive material prior to being wound about bladder 12. In one implementation, the threads forming windings 14 are formed of a high tensile strength material, such as nylon. In other implementations, the thread forming the windings 14 may comprise other materials, such as a polyurethane, other elastomeric materials, and nylon/urethane combinations. In one particular implementation, the windings 14 can be comprised of 2100 meters of 210 denier Nylon thread. The windings 14 reinforce the bladder 12 to assist in retaining the generally spherical shape of bladder 12. In another implementation, the layer of windings may be replaced by a plurality of textile patches adhesively applied to the outer surface of the bladder 12.

The layer of elastomeric material 16 is applied in the form of uncured segments, patches or panels of an elastomeric material, such as a rubber compound, over the bladder 12 and the windings 14. In one implementation, the rubber compound can include a foaming agent to produce sponge rubber once cured. The segments of elastomeric material are applied over, and enclose, the wound bladder. Alternatively, the segments of elastomeric material can be applied to the surface of a carcass-forming mold. The density of the windings 14 with its adhesive coating and the layer of elastomeric material 16 can be approximately 0.93 g/cm$^3$. The assembly of the bladder 12, the windings 14 and the elastomeric material 16 can be positioned within the carcass-forming mold and molded under heat and pressure to form the carcass 20. It is common for a portion of the layer of elastomeric material 16 to impregnate, bond to, or otherwise engage the layer of windings 14 during the carcass-molding process. In one implementation, the layer of elastomeric material 18 is a sponge rubber compound wherein the foaming agent activates during the carcass molding process. The rubber base in the sponge rubber compound can be chosen from butyl rubber, natural rubber, synthetic rubber, synthetic thermoplastic material, other elastomeric materials and/or combinations thereof. In other implementations, the elastomeric layer 16 can be made of other materials such as latex, a butyl rubber, a natural rubber, a synthetic rubber, a synthetic polymeric plastic material, or other elastomeric materials. In one particular implementation, the elastomeric material is a sponge rubber compound comprising natural rubber, butyl rubber and synthetic polybutadiene as described in Table 1, wherein the quantities listed are the amount of each ingredient in grams per batch of the rubber compound. In other implementations, other rubber or polymeric compounds can be used.

TABLE 1

Sponge Rubber Compound

| INGREDIENT | | QUANTITY (grams) PER BATCH (EX. BATCH SIZE OF 183.18 grams) |
|---|---|---|
| Natural Rubber | RSS No. 1 | 60.00 |
| Polybutadiene | BRO1 | 20.00 |
| Styrene Butadiene | SBR1778 | 20.00 |
| Zinc Oxide | | 4.80 |
| Accelerator, M | | 0.50 |
| Accelerator, DM | | 0.60 |
| Accelerator, TS | | 0.18 |
| Sulfur | | 2.40 |
| Antioxidant Sp | | 0.50 |
| Antioxidant NS | | 0.60 |
| Calcium Carbonate | Hakuenka CC. | 40.00 |
| Carbonic Black FEF | | 10.00 |
| Carbonic Black HAF | | 10.00 |
| Process bil | | 8.00 |
| Stearic Acid | | 1.00 |
| Foaming Agent | Cellmike | 4.50 |
| Total Batch: | | 183.18 |

The carcass-forming mold can include an arrangement of recesses, grooves, and/or projections to form the shape and structure of an outer surface of the carcass 20, after the carcass 20 is molded and cured. In one implementation, the carcass-forming mold produces the set of inwardly extending channels 26. The channels 26 defines a plurality of cover attachment regions about the outer surface of the carcass 20. In one implementation, the carcass 20 defines at least two, and less than or equal to sixteen, cover attachment regions. In particular implementations, the carcass defines eight, ten or twelve cover attachment regions. Each cover attachment region is configured to receive one of the plurality of cover panels 22. The set of channels 26 can be filled with the set of strips 24.

The cover assembly 18 is preferably comprised of the plurality of cover panels 22 and strips 24. In one implementation, the cover panels 22 include at least two cover panels 22 and less than or equal to sixteen cover panels 22. In particular implementations, the cover panels 22 includes eight, ten or twelve cover panels 22. The cover panels 22 are single or multi-layered sheets of material that are coupled to the cover attachment regions of the carcass 20. Preferably, the cover panels 22 are laminated to the cover attachment regions of the carcass 12. Alternatively, the cover panels 22 can be attached to the carcass 20 by other means, such as, for example, stitching, molding, pressing, bonding, and combinations thereof. The cover panels 22 preferably include peripheral edges that extend to the channels 26. The set of strips 24 are placed within and over the set of channels 26 between the cover panels 22. In one implementation, the cover assembly 18 covers the entire outer surface of the carcass 20. The cover assembly 18 is configured for impact with one or more playing surfaces and for contact with players. In one implementation, one or both of the cover panels 22 and the set of strips 24 can include a pebbled texture.

The cover panels 22 preferably include an outer layer 30 coupled to a backing 32. The outer layer 30 is formed or applied to the backing 32 such that a portion of the outer layer 30 impregnates, extends into, or otherwise engages the backing 32. Alternatively, the outer layer 30 can be attached to the backing 32 through an adhesive, bonding, stitching, or other conventional means. The outer layer 30 is preferably formed of a wear-resistant, resilient material having a high coefficient of friction value (or a high level of grip-ability). The material used to produce the outer layer 30 can be a natural rubber, a butyl rubber, natural leather, synthetic leather, a polyurethane, a thermoplastic material, a thermoset material, or other synthetic polymeric materials. The outer layer 30 can include alpha and/or graphical indicia 38. The indicia 38 can be a logo, a trademark, instructions, a design or other configuration.

The backing 32 is configured to increase the tensile strength of the cover panels 22. The backing 32 is made of a soft material, preferably a felt-like fabric. In one implementation, the backing 32 can be formed of micro-fibers. Alternatively, the backing 32 can be formed of other materials, such as, for example, other woven or unwoven fabrics, plastic, an elastomer, a rubber, and combinations thereof. The backing 32 is preferably configured to contact the outer surface of the carcass 20 In one implementation, peripheral regions of the backing 32 (and/or the outer layer 30) can be skived (tapered or thinned out) to produce a recess in the outer surface of the basketball 10 near the set of ribs 24. In implementation, the thickness of the cover panel can remain generally constant over the entire cover panel, and the contour of the carcass can be configured to provide recessed regions adjacent the channels 26 (or outwardly projecting ribs). The set of strips 24 can have a similar construction as that of the cover panels 22. The strips 24 can include an outer layer 34 and a strip backing 36, which can be substantially similar to the outer layer 30 and the backing 32 of the cover panels 22. The outer layer 34 is typically formed of a different color than the color of the outer layer 30 of the cover panel 22. In one implementation, the outer layer 30 is orange and the outer layer 34 is black. In other implementations, other color combinations or patterns can be used.

In an effort to improve the performance of a basketball, the inventors have identified that by reducing the moment of inertia (MOI) of the basketball, the basketball can exhibit improved performance characteristics. The MOI is measured with respect to a center point of the basketball. Several approaches to reducing the MOI of a basketball have been identified and are contemplated under the present invention. A player can more readily impart a spin onto a basketball having a reduced MOI when shooting. Additionally, players can induce more spin onto the ball during shooting when the basketball has a configuration that provides a reduced MOI over conventional basketball constructions. A basketball shot with a proper backspin in the range of 150 to 200 rpm has a higher likelihood of being a made basketball shot than a basketball shot with a backspin less than 100 rpm. Accordingly, a basketball having a reduced MOI can improve a players shooting ability, shooting percentage and overall performance. The reduced MOI basketball provides a reduced bounce or rebound off of the rim thereby making a shot with a reduced MOI ball softer and more likely to bounce into the basket following a shot off of the rim and/or backboard than the same shot with a basketball of conventional construction. The basketball with a reduced MOI provides greater maneuverability and is easier to use than a conventional basketball. Accordingly, a reduced MOI basketball is more easily handled during dribbling, passing and other in game ball movement activities. Still further, because the reduced MOI basketball is easier to use, a player can maintain a higher energy level when handling and shooting the basketball and become less fatigued.

A size 7, game-quality basketball configured for organized competitive play can include the characteristics of Table 2 below. W/A refers to the windings 14 with adhesive, and sponge rubber refers to the elastomeric layer 16 molded over the windings 14.

TABLE 2

|  | Bladder | W/A + Sponge Rubber | Carcass | Cover Panels | Total |
|---|---|---|---|---|---|
| Volume (cm$^3$) | 106.6 | 384.2 | 490.8 | 275.1 |  |
| Inner Radius (cm) | 11.475 | 11.544 | 11.475 | 11.769 |  |
| Outer Radius (cm) | 11.544 | 11.769 | 11.769 | 11.926 |  |
| Density (g/cm$^3$) | 1.124 | 0.93 |  | 0.416 |  |
| Mass (g) | 129.5 | 355.7 | 485.2 | 114.8 | 600 |
| MOI (kg cm$^2$) | 11.44 | 32.08 | 43.52 | 10.92 | 54.41 |

The basketball 10 having a reduced MOI can take a variety of different forms. The following tables illustrate representative implementations of basketballs having a reduced MOI. Table 3 below illustrates one set of implementations of the present invention, wherein the thickness of the individual layers of the basketball 10 remain the same, but mass is shifted inward from the elastomeric layer 16 to the bladder 12. FIG. 3 illustrates a basketball 10 configured in accordance with an implementation of Table 3. The shift in mass in this implementation can be accomplished by reducing fillers in the composition of the elastomeric layer and increasing the foaming agent to produce a lighter, less dense elastomeric layer 16. The bladder 12 can be formed with additional fillers to increase its density. Table 3 shows the shifting of mass in 25 gram increments. In alternative implementations, other the mass may be shifted in other amounts. In the implementations of Table 3, the basketball 10 has a total mass of 600.0 grams. In other implementations other total mass values within the acceptable weight range for a particular size basketball for a particular application can be used.

TABLE 3

Constant Thickness, Transfer of Mass Inward

| Bladder Mass (g) | W/A + Sponge Rubber Layer (g) | Cover Panels Mass (g) | Total Mass (g) | Ball MOI (kg cm$^2$) | % Change in MOI | % Change in Spin Rate | Bladder % of Total Mass |
|---|---|---|---|---|---|---|---|
| 129.5 | 355.7 | 114.8 | 600.0 | 54.4 | 0 | 0 | 21.6 |
| 154.5 | 330.7 | 114.8 | 600.0 | 54.35 | 0.104 | 0.052 | 25.7 |
| 179.5 | 305.7 | 114.8 | 600.0 | 54.29 | 0.209 | 0.104 | 29.9 |
| 204.5 | 280.7 | 114.8 | 600.0 | 54.23 | 0.314 | 0.157 | 34.1 |
| 229.5 | 255.7 | 114.8 | 600.0 | 54.17 | 0.418 | 0.209 | 38.2 |
| 254.5 | 230.7 | 114.8 | 600.0 | 54.12 | 0.522 | 0.262 | 42.4 |

As shown in Table 3, basketballs configured in accordance with the implementation of Table 3 with mass shifted from the elastomeric layer 16 to the bladder 12 results in a reduction in the MOI and an increase in the spin rate of a basketball when undergoing a typical shot attempt.

Table 4 below illustrates one set of implementations of the present invention, wherein the overall mass of a basketball 100 is reduced by removing 15 grams of weight from the elastomeric layer 16, the thickness of the individual layers of the remain the same, and additional mass is shifted inward from the elastomeric layer 16 to the bladder 12. FIG. 4 illustrates the basketball 100 configured in accordance with an implementation of Table 4. The basketball 100 is substantially similar to the basketball 10 except the elastomeric layers 16 has a density that is further reduced. The removal of, and shift in, mass in this implementation can be accomplished by reducing fillers in the composition of the elastomeric layer and increasing the foaming agent to produce a lighter, less dense elastomeric layer 16. The bladder 12 can be formed with additional fillers to increase its density. Table 4 shows the removal of 15 grams of weight, and then the shifting of mass in 25 gram increments. In alternative implementations, other amounts of mass may be removed and/or shifted. In the implementations of Table 4, the basketball 10 has a total mass of 585 grams, which remains in the acceptable range of 566 to 625 grams for size 7 game balls for organized competitive play. In other implementations other total mass values within the acceptable weight range for a particular size basketball for a particular application can be used.

TABLE 4

Constant Thickness, Reduction in Weight and Transfer of Mass Inward

| Bladder Mass (g) | W/A + Sponge Rubber Layer (g) | Cover Panels Mass (g) | Total Mass (g) | Ball MOI (kg cm²) | % Change in MOI | % Change in Spin Rate | Bladder % of Total Mass |
|---|---|---|---|---|---|---|---|
| 129.5 | 355.7 | 114.8 | 600 | 54.4 | 0 | 0 | 21.6 |
| 129.5 | 340.7 | 114.8 | 585 | 53.05 | 2.48 | 1.26 | 22.1 |
| 154.5 | 315.7 | 114.8 | 585 | 52.99 | 2.58 | 1.32 | 26.4 |
| 179.5 | 290.7 | 114.8 | 585 | 52.94 | 2.69 | 1.37 | 30.7 |
| 204.5 | 265.7 | 114.8 | 585 | 52.88 | 2.79 | 1.42 | 35.0 |
| 229.5 | 240.7 | 114.8 | 585 | 52.83 | 2.9 | 1.48 | 39.2 |
| 254.5 | 215.7 | 114.8 | 585 | 52.77 | 3 | 1.53 | 43.5 |

As shown in Table 4, basketballs configured in accordance with the implementation of Table 4 with mass removed from the elastomeric layer 16, and additional mass shifted from the elastomeric layer 16 to the bladder 12 results in an even greater reduction in the MOI and a greater increase in the spin rate of a basketball when undergoing a typical shot attempt than present in the implementations of Table 3.

Table 5 below illustrates one set of implementations of the present invention, wherein the overall mass of a basketball 200 is reduced by shifting mass inward from the elastomeric layer 16 to the bladder 12. The additional mass is added to the bladder by increasing the thickness of the bladder 12 by increments of 0.02 cm. The density of the bladder 12 remains constant with respect to the base case of Table 2. FIG. 5 illustrates the basketball 200 configured in accordance with an implementation of Table 5. The basketball 200 is substantially similar to the basketball 10 except the elastomeric layers 16 has a density that is further reduced, and the bladder 12 has increased thickness. The shift in mass in this implementation can be accomplished by reducing fillers in the composition of the elastomeric layer and increasing the foaming agent to produce a lighter, less dense elastomeric layer 16. Table 5 shows the shifting of mass in 36-37 gram increments. In alternative implementations, other amounts of mass may be removed and/or shifted. In the implementations of Table 5, the basketball 200 has a total mass of 600 grams, which remains in the acceptable range of 566 to 625 grams for size 7 game balls for organized competitive play. The basketball 10 of Table 5 also has a diameter of 11.926 cm. In other implementations other total mass values within the acceptable weight range for a particular size basketball for a particular application can be used.

TABLE 5

Transfer of Mass Inward and Increase in Thickness of Bladder

| Bladder Inner Radius (cm) | Bladder Outer Radius (cm) | Bladder Mass (g) | W/A + Sponge Rubber Layer Mass (g) | Cover Panels Mass (g) | Total Mass (g) | Ball MOI (kg cm²) | % Change in MOI | % Change in Spin Rate | Bladder % of Total Mass | Bladder % of Total Thickness |
|---|---|---|---|---|---|---|---|---|---|---|
| 11.475 | 11.544 | 129.5 | 356.1 | 114.8 | 600 | 54.4 | 0 | 0 | 21.6 | 15.3 |
| 11.455 | 11.544 | 166.2 | 319 | 114.8 | 600 | 54.3 | 0.202 | 0.101 | 27.7 | 18.9 |
| 11.435 | 11.544 | 203.2 | 282 | 114.8 | 600 | 54.17 | 0.425 | 0.213 | 33.9 | 22.2 |
| 11.415 | 11.544 | 240.1 | 245.1 | 114.8 | 600 | 54.04 | 0.667 | 0.335 | 40.0 | 25.2 |
| 11.395 | 11.544 | 276.9 | 208.3 | 114.8 | 600 | 53.9 | 0.929 | 0.467 | 46.2 | 28.1 |
| 11.375 | 11.544 | 313.5 | 171.7 | 114.8 | 600 | 53.74 | 1.211 | 0.611 | 52.2 | 30.7 |

As shown in Table 5, basketballs configured in accordance with the implementation of Table 5 with mass removed from the elastomeric layer 16 and shifted to the bladder 12, and the thickness of the bladder 12 increasing results in a reduction in the MOI and an increase in the spin rate of a basketball when undergoing a typical shot attempt than present in a base case basketball construction of Table 2.

Table 6 below illustrates one set of implementations of the present invention. The implementations of Table 6 are similar to those of Table 5, except the overall mass of a basketball 200 is reduced by removing 15 grams of weight from the elastomeric layer 16, and the overall mass of a basketball 200 is shifted inward from the elastomeric layer 16 to the bladder 12. Additional mass is added to the bladder by increasing the thickness of the bladder 12 by increments of 0.02 cm. The density of the bladder 12 remains constant with respect to the base case of Table 2. FIG. 5 illustrates the basketball 200 configured in accordance with an implementation of Table 5 and Table 6. The basketball 200 is substantially similar to the basketball 10 except the elastomeric layers 16 has a density that is further reduced, and the bladder 12 has increased thickness. The shift in mass in this implementation can be accomplished by reducing fillers in the composition of the elastomeric layer and increasing the foaming agent to produce a lighter, less dense elastomeric layer 16. Table 6 shows the shifting of mass in 36-37 gram increments. In the implementations of Table 6, the basketball 200 has a total mass of 585 grams, which remains in the acceptable range of 566 to 625 grams for size 7 game balls for organized competitive play. In alternative implementations, other amounts of mass may be removed and/or shifted.

TABLE 6

Transfer of Mass Inward and Increase in Thickness of Bladder

| Bladder Inner Radius (cm) | Bladder Outer Radius (cm) | Bladder Mass (g) | W/A + Sponge Rubber Layer Mass (g) | Cover Panels Mass (g) | Total Mass | Ball MOI (kg cm$^2$) | % Change in MOI | % Change in Spin Rate |
|---|---|---|---|---|---|---|---|---|
| 11.475 | 11.544 | 129.5 | 355.7 | 114.8 | 600 | 54.4 | 0 | 0 |
| 11.475 | 11.544 | 129.5 | 340.7 | 114.8 | 585 | 53.04 | 2.49 | 1.27 |
| 11.455 | 11.544 | 167.2 | 303 | 114.8 | 585 | 52.93 | 2.7 | 1.37 |
| 11.435 | 11.544 | 204.2 | 266 | 114.8 | 585 | 52.82 | 2.92 | 1.49 |
| 11.415 | 11.544 | 240.1 | 230.1 | 114.8 | 585 | 52.68 | 3.17 | 1.62 |
| 11.395 | 11.544 | 276.9 | 193.3 | 114.8 | 585 | 52.54 | 3.43 | 1.76 |

As shown in Table 6, basketballs configured in accordance with weight removed from the basketball and with mass transferred from the elastomeric layer 16 and shifted to the bladder 12, and the thickness of the bladder 12 increasing results in a significant MOI reduction and an increase in the spin rate of a basketball when undergoing a typical shot attempt than present in a base case basketball construction of Table 2.

Table 7 below illustrates one set of implementations of the present invention. The implementations of Table 7 are similar to those of Table 5, except the overall mass of a basketball 200 is shifted from the elastomeric layer 16 to the bladder 12 by increasing the density of the bladder and by increasing the thickness of the bladder 12 by increments of 0.02 cm. FIG. 6 illustrates the basketball 300 configured in accordance with an implementation of Table 7. Additionally, the thickness of the cover layer 18 is increased, thereby moving the bladder 12 further closer to the center of the basketball 300. The shift in mass in this implementation can be accomplished by reducing fillers in the composition of the elastomeric layer and increasing the foaming agent to produce a lighter, less dense elastomeric layer 16. Table 7 shows the shifting of mass of the bladder and the sponge rubber layer by certain increments. In alternative implementations, other amounts of mass may be removed and/or shifted.

TABLE 7

Transfer of Mass Inward, Increase in Cover Panel Thickness, and Increase in the Density and Thickness of Bladder

| Bladder Inner Radius (cm) | Bladder Outer Radius (cm) | Bladder Mass (g) | W/A + Sponge Rubber Layer Mass (g) | Cover Panel Thickness | Cover Panels Mass (g) | To-tal Mass (g) | Ball MOI (kg cm²) | % Delta in MOI | % Delta in Spin Rate | Density Bladder (g/cm³) | Density of Carcass (g/cm³) | Density of Cover Panels (g/cm³) | W/A + Sp. Rubber Thickness |
|---|---|---|---|---|---|---|---|---|---|---|---|---|---|
| 11.475 | 11.544 | 129.5 | 355.7 | 0.157 | 114.8 | 600 | 54.4 | 0 | 0 | 1.127 | 0.926 | 0.415 | 0.225 |
| 11.425 | 11.514 | 166.2 | 319 | 0.167 | 114.8 | 600 | 54.11 | 0.53 | 0.265 | 1.130 | 0.765 | 0.390 | 0.245 |
| 11.375 | 11.484 | 204.2 | 281 | 0.177 | 114.8 | 600 | 53.79 | 1.11 | 0.561 | 1.14 | 0.625 | 0.368 | 0.265 |
| 11.325 | 11.454 | 240.1 | 245.1 | 0.187 | 114.8 | 600 | 53.46 | 1.73 | 0.874 | 1.142 | 0.509 | 0.349 | 0.285 |
| 11.275 | 11.424 | 276.9 | 208.3 | 0.197 | 114.8 | 600 | 53.10 | 2.38 | 1.213 | 1.148 | 0.406 | 0.331 | 0.305 |
| 11.225 | 11.394 | 313.5 | 171.7 | 0.207 | 114.8 | 600 | 52.73 | 3.08 | 1.575 | 1.154 | 0.315 | 0.316 | 0.325 |

Table 7 illustrates that the mass and the thickness of the layers can be varied to move more mass of the basketball 300 closer to the center of the ball and thereby reduce the MOI of the basketball 300. The implementations of Table 7 can result in a reduction of MOI that is greater than 3 percent from a typical game ball.

Table 8 below illustrates one set of implementations of the present invention. The implementations of Table 8 are similar to those of Table 4, except that 15 grams of mass or weight of the basketball 400 can be transferred from the elastomeric layer 16, and positioned at the center of the bladder 412. The overall mass of the basketball 400 can be further shifted inward from the elastomeric layer 16 to the bladder 12 by increasing the density of the bladder 412. Unlike Table 4, the total mass of the ball remains 600 grams as weight is shifted to the bladder due to the 15 grams of mass positioned at the center of the bladder 412. FIGS. 7 through 22 illustrates the basketball 400 configured in accordance with multiple implementations of Table 8. The basketball 400 is substantially similar to the basketball 10 except the elastomeric layers 16 has a density that is further reduced, and the bladder 12 has increased density. In an alternative implementation, the bladder can be have its mass shifted by increasing its thickness.

TABLE 8

Transfer of Mass Inward and Increase in Thickness of Bladder

| Bladder Mass (g) | W/A + Sponge Rubber Layer (g) | Cover Panels Mass (g) | Total Mass (g) | Ball MOI (kg cm²) | % Change in MOI | % Change in Spin Rate | Bladder % of Total Mass |
|---|---|---|---|---|---|---|---|
| 129.5 | 355.7 | 114.8 | 600 | 54.4 | 0 | 0 | 21.6 |
| 129.5 | 340.7 | 114.8 | 600 | 53.05 | 2.48 | 1.26 | 22.1 |
| 154.5 | 315.7 | 114.8 | 600 | 52.99 | 2.58 | 1.32 | 26.4 |
| 179.5 | 290.7 | 114.8 | 600 | 52.94 | 2.69 | 1.37 | 30.7 |
| 204.5 | 265.7 | 114.8 | 600 | 52.88 | 2.79 | 1.42 | 35.0 |
| 229.5 | 240.7 | 114.8 | 600 | 52.83 | 2.9 | 1.48 | 39.2 |
| 254.5 | 215.7 | 114.8 | 600 | 52.77 | 3 | 1.53 | 43.5 |

Basketballs 400 configured in accordance the implementations of Table 8 with weight removed from the elastomeric layer 16 and shifted to the bladder 12, and positioning 15 grams of weight at the center of the basketball 400 results in a significant MOI reduction and an increase in the spin rate of a basketball when undergoing a typical shot attempt than present in a base case basketball construction of Table 2. In other implementations, other amounts of mass other than 15 grams can be shifted to at or near the center of the basketball 400.

Tables 3 through 8 illustrate example implementations of the present invention. In the examples the mass and thickness of the layers of the basketball are altered to shift mass or weight further toward the center of the basketball to provide reduced MOI. Any combination of such variations in the density, thickness, overall mass or composition resulting in a reduced MOI are contemplated under the present invention.

Figure 9:
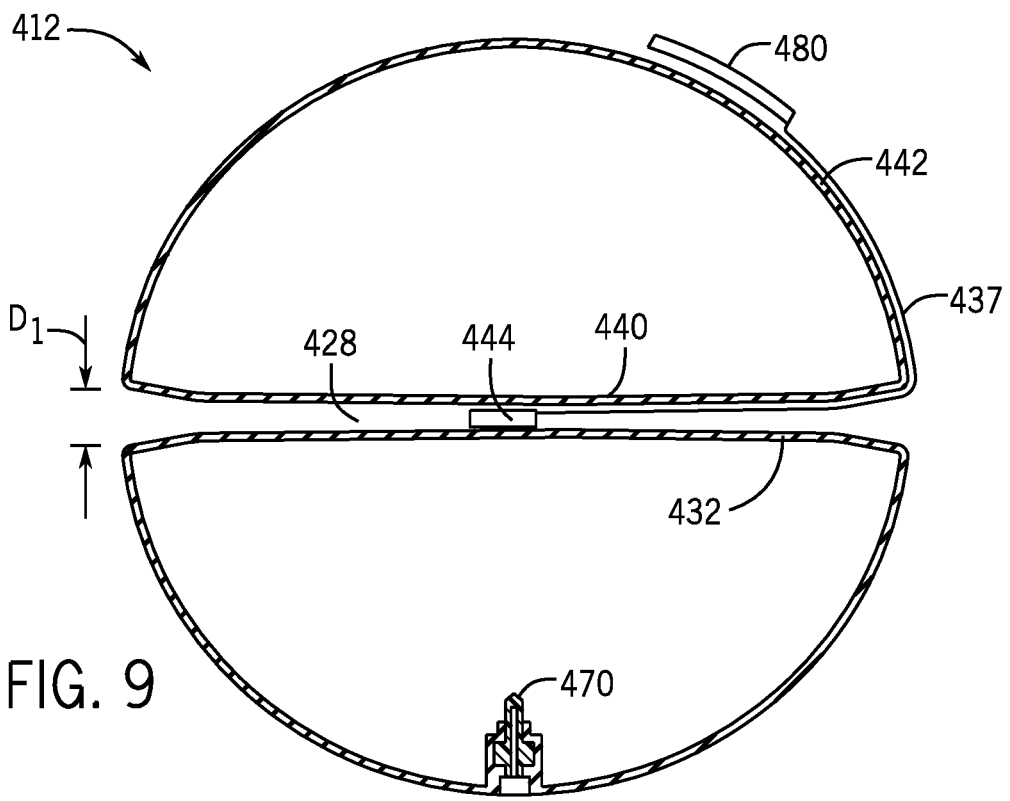
FIG. 9 is a sectional view of a portion of another implementation of the basketball of FIG. 8.
Figure 10:
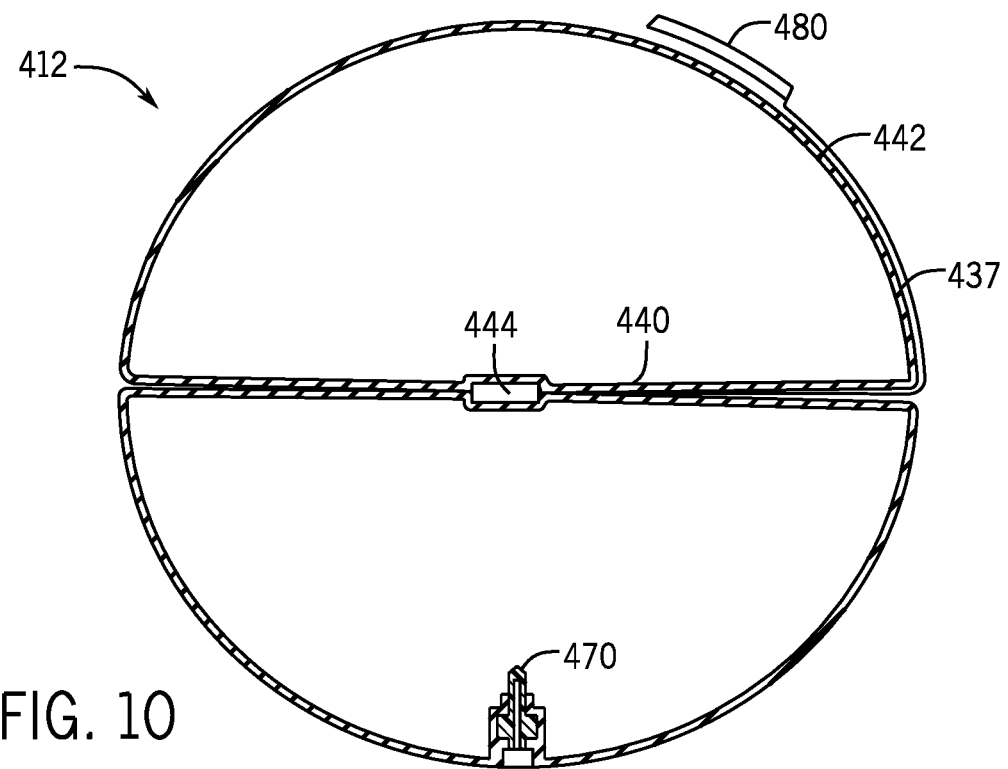
FIG. 10 is a sectional view of a portion of another implementation of the ball of FIG. 8.

FIGS. 9 through 22 illustrate alternate implementations of a bladder 412 that applies mass at or near the center of the basketball 400. Referring to FIGS. 9 and 10, the bladder 412 can comprise an internal tubular portion 440. The internal tubular portion 440 can include a flexible tubing extending through an intersecting a center point of basketball 400 and an outer wall 442 of the bladder 412. As a result, the outer wall 442 and tubular portion 440 can form a donut-like inflatable interior which encircles tubular portion 440. The tubular portion 440 can be sized to receive a mass, which can be an electronic chip 444 or can be a simple weight formed of a plastic, metal, ceramic or other material.

Figure 8:
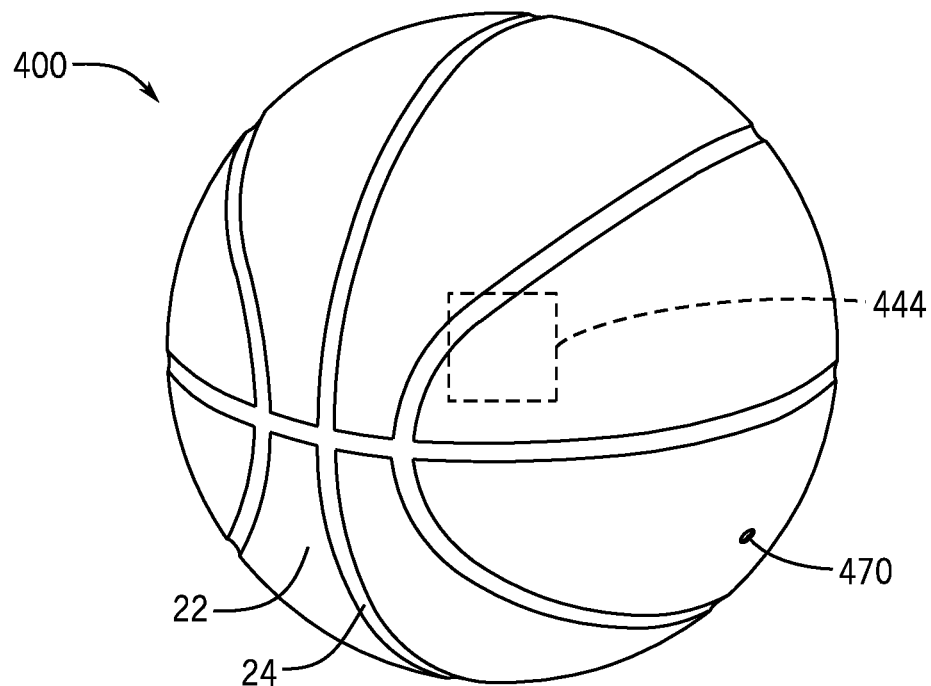
FIG. 8 is a perspective view of a basketball in accordance with implementations of the present invention.
Figure 8A:
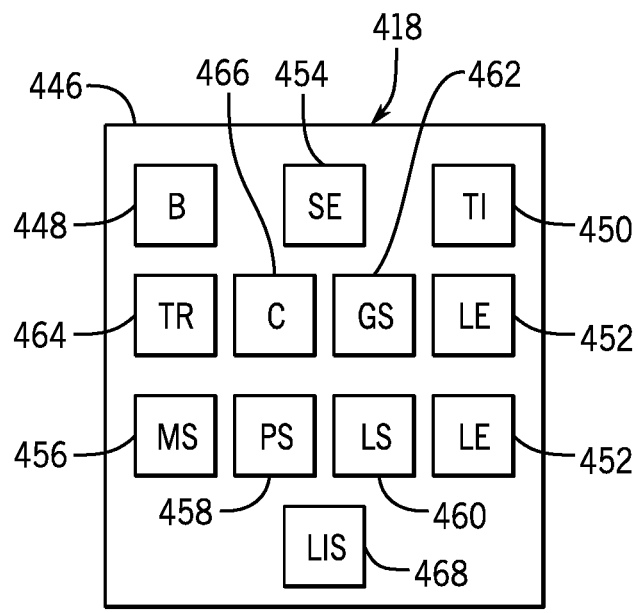
FIG. 8A is a schematic diagram of an example of electronics of the ball of FIG. 8.

Referring to FIGS. 8, 8A and 9, the electronic chip 444 is shown in association with the basketball 400. The electronic chip 444 is configured to actively transmit one or more electronic signals used to indicate the location, movement, speed, acceleration, deceleration, rotation, pressure and/or temperature of the basketball. Alternatively, the electronic chip 444 can include a passive circuit that allows for the detection of the location, movement, speed, acceleration, deceleration, rotation and/or temperature of the basketball to be ascertained when subjected to a magnetic field or other sensing system. The electronic chip 444 can have a weight or mass of 15 grams. In other implementations, the chip 444 can have other weight or mass amounts.

FIG. 8A schematically illustrates one example of electronic chip 444. In one implementation, electronic chip 444 can include a substrate 446, battery 448, timer 450, light emitters 452, sound emitter 454, motion sensor 456, pressure sensor 458, location sensor 460, gripping sensor 462, transmitter 464, and controller 466. Substrate 446 comprises a chip, platform or panel to support one or more of battery 448, light emitters 452, sound emitter 454, light sensors 468, motion sensor 456, transmitter 464 and controller 466. In one implementation, substrate 446 includes several distinct portions which collectively support the aforementioned components. In one implementation, one or more of such components are supported independent of substrate 446. For example, in one implementation, controller 466 may be supported by chip 444, wherein light emitters 452 are supported by different structures at different locations within or throughout basketball 310. The substrate can be planar or take other shapes. The substrate can be rigid or flexible.

Battery 448 comprises an energy storage device with supplies electrical power to at least light emitters 452 or other electronic components. In one implementation, battery 448 comprises one or more rechargeable electrical storage devices, such as one or more capacitors, supported by substrate 446 and in electrical connection with light emitters 452, either directly through one or more electrical wires or traces or through controller 466. In another implementation, battery 448 may comprise a battery that is not rechargeable. In one implementation, battery 448 comprises a removable disposable battery supported independent of substrate 446 and electrically connected to one or more components supported by substrate 446.

Timer 450 comprises one or more devices that track the passage of time. In one implementation, timer 450 comprises timer circuitry which electronically or digitally tracks time. Although illustrated as being supported by substrate 446, in other implementations, timer 450 may comprise a separate component provided as part of basketball 400, but in communication with circuit chip 418. In one implementation, timer 450 may be manually or automatically synced with other timers associated with a basketball game, scrimmage, practice or the like. In some implementations, timer 450 may serve as the main or sole timer for a basketball game. In some implementations, timer 450 functions similar to a stopwatch, being started and stopped in response to signals received through transceiver 464 or in response to sensed inputs received through grip sensor 462. As will be described hereafter, signals from timer 450 or times indicated by timer 450 may be used by controller 466 as a basis for adjusting lighting characteristics of light emitters 452 or output by sound emitter 454. In some implementations, timer 450 may be omitted.

Light emitters 452 comprise devices configured to emit visible light or electromagnetic radiation, wherein the emitted visible illuminates portions of basketball 310. In one implementation, light emitters 452 are supported by substrate 128 and comprise lighting elements such as light emitting diodes. In other implementations, light emitters 452 comprise other light emitting elements using other light emitting technologies. Although basketball 400 is illustrated as including two distinct light emitters 452, in other implementations, basketball 400 may include a greater or fewer of such light emitters 452. Although illustrated as being supported on support substrate 446, in other implementations, light emitters 452 may be supported distinct from substrate 446, such as along an electrical wire, an electrical trace or an electrical string supported elsewhere by basketball 400.

In various implementations, selected portions of basketball 400 can be formed from materials to facilitate the transmission of light generated by the one or more of light emitters 452. For example, in one implementation, light emitters 452 are supported within a central portion or interior of basketball 400, within bladder 412. In such an implementation, at least portions of bladder 412 can be formed from one or more materials so as to be translucent or transparent to the light emitted by light emitters 452. In one implementation, the entirety of bladder 412 or substantially and entirety of bladder 412 is translucent or transparent. In another implementation, selected portions of bladder 412 are translucent or transparent.

In each of the aforementioned implementations, light emitters 452 may alternatively be supported external to bladder 412, between bladder 412 and the exterior of basketball 400. In such implementations, light emitters may be supported adjacent or in near vicinity to those particular portions of basketball 400 which are translucent or transparent. In some implementations, light emitters 452 are supported directly along the exterior surface of basketball 400 or within and interior portion of basketball 400, wherein at least portions of basketball 400 outside of the light emitter are translucent or transparent.

Sound emitter 454 comprises a device, such as a speaker, to emit auditable sounds in response to control signals from controller 466. In one implementation, sound emitter 454 emits beeps. In another implementation, sound emitter 454 emits speech or words. For example, in one implementation, sound emitter 454 may emit a beep or predefined series or pattern of beeps in response to a particular characteristic detected by either motion sensor 456 or pressure sensor 458, or in response to signals received via transceiver 464. In another implementation, sound emitter 454 may emit words, such as words of status, such as a number indicating a rotational speed of basketball 400, words of encouragement such as "nice shot" or words of instruction such as "change grip", "increase backspin", or "inflate" in response to a control signals from controller 466 based upon sensed values from motion sensor 456, pressure sensor 458, location sensor 460, or in response to signals received via transceiver 464. In some implementations, sound emitter 454 is omitted from basketball 400, wherein sounds are not generated or wherein separate and distinct sound emitters outside of basketball 400 and remote from basketball 400 are utilized to emit sounds in response to signals transmitted by basketball 400.

Light sensors 468 comprise one or more light sensors that detect ambient lighting with respect to basketball 400. The detected lighting is transmitted to controller 466. One implementation, light sensors 468 may be located or supported along the exterior surface of basketball 400. In other implementations, light sensors 468 may be embedded below external surface of basketball 400, wherein overlying portions are transparent or translucent. Ambient lighting conditions detected by light sensors 468 are communicated to controller 466 for controlling an on-off-state of light emitters 452 or for adjusting the brightness of light provided by light emitters 452. In some implementations, light sensors 468 may be omitted.

Motion sensor 456 comprises one or more sensors to detect motion of basketball 400. In one implementation, sensor 456 comprises an accelerometer, such as a dual axis accelerometer. In one implementation, sensor 456 comprises a sensor to detect 6 degrees of freedom or motion. In another implementation, sensor 456 can be comprised with a sensor to detect 9 degrees including linear movement, rotational movement, and movement with respect to polar axes and the ground (gravity). Conditions detected by sensor 456 are transmitted to controller 466. Signals from motion sensor 456 may indicate a rotation or spin of basketball 400, its travel arc, arc height and the like.

Pressure sensor 458 comprises one or more sensors to detect an internal pressure within bladder 412. One implementation, sensor 458 comprises a pneumatic sensor that detects air pressure changes within bladder 412. The sensor 458 can be used to monitor air pressure within the bladder 412 and serve to activate the electronic circuit when a pressure fluctuation is sensed. In this manner, the sensor 458 can be used as part of the control logic of the electronic chip 444 to maximize available battery life of the electronic sensor and/or circuit. The electronic chip 444 can include shutdown logic that places the electronics of the electronic chip 444 into a standby or sleep mode until the basketball 400 is put into play. When the basketball 400 is moved, passed, kicked or punted, the air pressure within the basketball 400 can fluctuate or change. This change in air pressure is sensed by the sensor 458, which then activates the electronic chip 444 and places it in an operating mode. In an alternative example implementation, the sensor 458 can be a piezoelectric sensor The air pressure sensor 458 can also be used to indicate the air pressure within the bladder 412 and therefore the pressure of the basketball 400 itself. The signal produced through the sensor 458 and from the electronic chip 418 can be used to confirm that the air pressure is within a desired range or at a specific desired setting. For example, NBA basketballs have a recommended air pressure of 9.5 psi, and the NCAA® game basketball has a recommended air pressure range of 7 to 9 psi. If the game balls have the pressure sensor 458, one could use this information to select the most properly inflated basketball. The electronic chip 418 can also include a temperature sensor for monitoring the temperature of the basketball 400. In some implementations, pressure sensor 458 is omitted.

Location sensor 460 comprises one or more sensors to detect a location of basketball 400. In one implementation, location sensor 460 comprises a global positioning system (GPS) sensor/receiver. In another implementation, location sensor 460 may additionally or alternatively comprise a magnetometer which sensors magnetic fields or polar magnetic fields to determine a location or position of basketball 400

In one implementation, the user is instructed to stand at the approximate distance from a ferromagnetic basketball rim or other ferromagnetic reference structure. The user indicates where he or she is located or distance from the ferromagnetic reference structure. The user is then instructed to shoot the basket towards the ferromagnetic reference structure. The system uses the first location as a reference point and the first shot as reference throw (alternatively, the user can also indicate where the ferromagnetic reference structure is located). With the reference shot, the system knows when it reaches the reference structure (the magnetometer senses the polar magnetic field, but also field from the metallic reference structure). The ferromagnetic reference structure creates the equivalent of some noise or alters the polar magnetic force slightly.

Once the system knows the initial shot position. It knows that the user was facing the reference structure at a known distance feet away, and that the user was directly in front of the reference structure. The location and shot are subsequently utilized as a reference. Then, with all subsequent positions for basketball 400, such references are used to determine subsequent locations of the basketball. In one implementation, subsequent shots are analyzed using 6 degree of freedom sensors (one sensor covers 3 directions of ball movement with respect to the x, y and z axes, the second sensor is referencing gravitational pull with respect to the x, y and z axes, and the distance to the ground, and the magnetometer measures the strength of the magnetic field to know where it is in relation to north) and the magnetometer. In some implementations, one or more of motion sensor 456, position sensor 458, or location sensor 460 are omitted.

Grip sensor 462 comprises one or more sensors located in or on basketball 400 to detect manual gripping of basketball 400. For example, in one implementation, grip sensors 462 comprise pressure, contact other types of sensors on the surface of or within grooves 26. Such sensors provide electrical signals to chip 418 and controller 466 indicating that basketball 400 is being manually gripped along grooves 26 or strips 24 or how grooves 26 are currently being contacted or gripped by a person's hand. In other implementations, gripping sensors 462 may be omitted.

Transceiver 464 comprises a device to transmit and receive signals with respect to a device distinct from basketball 400. In one implementation, transceiver 464 facilitates communication between controller 466 and a local or wide area network such as a phone network or the Internet. In one implementation, transceiver 464 additionally or alternatively facilitates communication between controller 466 and a portable electronic device, such as a cell phone, a smart phone, a flash player, a personal data assistant, a notebook, netbook or laptop computer or the like. Such communication may comprise the transmission of selections or commands to controller 466 and basketball 400 or the output of data from basketball 400 for remote or external analysis, storage and visual or graphical representation. In one implementation, transceiver 464 may comprise a Bluetooth transceiver. In another implementation, transceiver 464 may comprise a radiofrequency transceiver. In some implementations, transceiver 464 may be omitted.

Controller 466 comprises one or more integrated circuits or processing units to generate control signals directing the operation of light emitters 452 and sound emitter 454 based upon information received from sensors 468, 456, 458, 460, 462 and control or data signals received through transceiver 464. In one implementation, controller 466 generates control signals that control the emission of light by light emitters 452.

In one implementation, the chip 444 can include a potting compound comprises a mass of solid compound at least substantially encapsulating, if not completely encapsulating, electronics. For purposes of this disclosure, the term "encapsulate" or "encapsulating" refers to a body or mass of material that contacts and closely conforms to the shape of the item being encapsulated which occurs as a result of the mass of material by being applied to the item being encapsulated while in a liquid, amorphous or gelatinous form, where the mass subsequently solidifies while about and against the item being encapsulated. The term "substantially encapsulate" or "substantially encapsulating" refers to the mass of material about and in close conformal contact with at least three sides of the item being encapsulated. The term "completely encapsulate" or "completely encapsulating" refers to the mass of material surrounding and enclosing on all sides the item being encapsulated.

In one implementation, the potting compound can be a solidified mass of previously amorphous, gelatinous or liquid material. In one implementation, potting compound comprises a polyurethane, silicone or other solidified polymer. In one implementation, potting compound comprises a thermosetting plastic or silicone rubber gel. In another implementation, the potting compound can be formed of an epoxy, acrylonitrile butadiene styrene (ABS), or other thermoplastic material. In one implementation, potting compound comprises a low glass transition temperature potting compound to inhibit breakage of solder bonds during solidification.

Potting compound, when solidified or hardened, forms an encapsulating body encapsulating electronics of the chip 444. Encapsulating body is sized and shaped to fit within a cavity, pocket, or receptacle such as, for example, tubular portion 440. The encapsulating body can have an outer profile or shape that substantially matches the outer profile or shape of cavity so as to restrict or limit movement of body within cavity. The potting compound can completely encapsulates electronics of chip 444 except for one or more electrical conductors or electrical filaments, wires or traces extending from electronics. In other implementations, the potting compound can encapsulate a portion of the chip 444 and its electronics.

FIGS. 9 and 10 illustrate bladder 412 in two different inflation states. FIG. 9 illustrates bladder 412 in an uninflated or partially inflated state while FIG. 10 illustrates bladder 412 in a greater inflation state wherein bladder 412 has a greater internal air pressure. An air valve 470 is coupled to the wall 442 of the bladder 412. The air valve 470 enables air to be pumped or injected into the bladder 412 through use of an inflation needle (not shown). The air valve 470 is configured to retain the air pressure within the bladder 412 once the inflation needle is removed. As shown by FIG. 9, when bladder 412 is in the uninflated or partially inflated state, tubular portion 440 has an enlarged internal diameter D1 which facilitates insertion of circuit chip 444 into tubular portion 440. In one implementation, electronics or circuit chip 444 is positioned at a center point of bladder 412 of basketball 400 within tubular portion 440. In one implementation, circuit chip 444 is inserted into tubular portion 440 while electrical leads or wires 437 remain connected to circuit chip 444 and extend from circuit chip 444 out of to the portion 440 for connection to electronics 480 or other devices along an exterior of bladder 412. In another implementation, wires 437 and/or electronics 480 can be omitted. In one implementation, the enlarged internal diameter of tubular portion 440 facilitates pulling or fishing of circuit chip 444 into the interior of tubular portion 440. In another implementation, the enlarged internal diameter of tubular portion 440 facilitates pushing circuit chip 444 into the interior of tubular portion 440 with a push rod or other push device.

As shown by FIG. 10, when bladder 412 is more fully inflated, tubular portion 440, under the increased pressure resulting from the increased internal pressure of bladder 412, collapses about circuit chip 444 and about electrical line 437. To facilitate such a collapse, tubular portion 440 is formed from one or more materials and/or has one or more appropriate wall thicknesses that cause such a collapse in response to bladder 412 being more fully inflated as compared to when circuit chip 444 was inserted into tubular portion 440. In the example illustrated, tubular portion 440 is configured (using materials and material wall thickness) such that to the portion 440 collapses about circuit chip 444 prior to bladder 412 being inflated above or beyond a maximum recommended in use inflation pressure (the inflation pressure that users are instructed to use with basketball 400, found on packaging or on an exterior of basketball 400) for bladder 412 and for basketball 400. In the example illustrated, tubular portion 440 is configured such that portion 440 collapses about circuit chip 444 prior to bladder 412 for being inflated above or beyond a middle of the recommended in use inflation pressure for bladder 412 and for basketball 400. In the example illustrated, tubular portion 440 is configured such that portion 440 collapses about circuit chip 444 prior to bladder 412 for being inflated above or beyond a minimum recommended in use inflation pressure for bladder 412 and for basketball 400.

Because tubular portion 440 collapses about circuit chip 444, tubular portion 440 retains circuit chip 444 in place without the use of welding, adhesives, glues or other affixing mechanisms or materials. In one implementation, tubular portion 440 collapses about circuit chip 444 to such an extent so as to form a water or moisture impermeable seal about circuit chip 444, protecting circuit chip 444 from such water or moisture. In the example illustrated, substantially the entirety of tubular portion 440, from one side of basketball 400 to the other side of basketball 400 collapses. In such implementations, because the two opposite end openings of tubular portion 440 are substantially closed along or adjacent to outer wall 420, plugs or other seals may be omitted as such openings may be omitted.

In the example illustrated in FIG. 10, substantially an entirety of tubular portion 440 extending through the interior bladder 412 has a uniform or homogenous construction such that the entirety of tubular portion 440 collapses upon greater inflation of bladder 412. In such an implementation, multiple circuit chips 444, other discrete electronics packages or weights may be inserted into to the portion 440 while bladder 412 is in the lower inflation state shown in FIG. 9, wherein upon being more fully inflated, tubular portion 440 collapses about each of the multiple circuit chips 444 and/or electronics packages, allowing different circuit chips 444 or circuit chip 444 and other electronics, such as light emitters, sound emitters and the like that may be electrically connected to circuit chip 444, to be physically separated or walled off from one another and retained in place.

In another implementation, the tubular portion 440 of FIG. 9 can be formed of a rigid or substantially rigid material forming a continuous passage or tube through the bladder 412. The chip 444 can be inserted within the tubular portion 440 to the desired position and secured to the rigid or substantially rigid tubular portion 440 through an adhesive or other fastening means, such as for example, press fit connections, plugs, etc.

Figure 11:
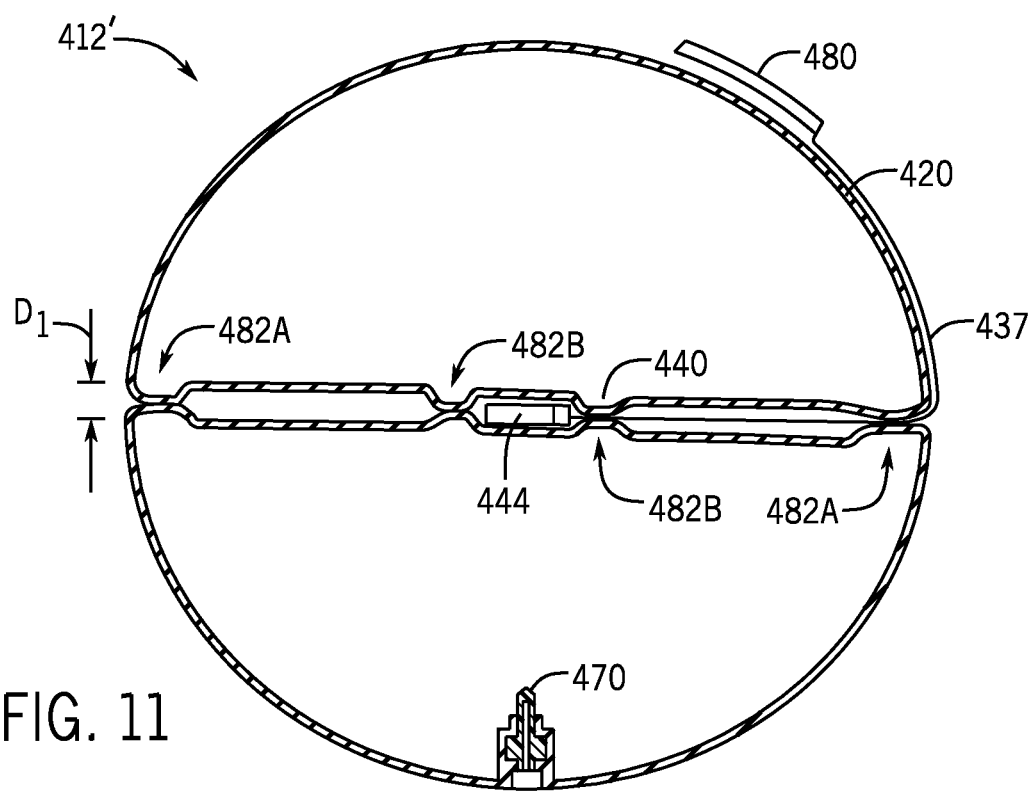
FIG. 11 is a sectional view of a portion of another implementation of the ball of FIG. 8.

FIG. 11 illustrates bladder 412' of basketball 400. Bladder 412' is similar to bladder 412 except that bladder 412' comprises tubular portion 440' having discrete portions or segments 482A and 482B (collectively referred to as segments 482) that are configured (through materials or wall thicknesses) to collapse (flex or expand towards the opposite circumferential side of tubular portion 440) differently than other portions of tubular portion 440'. In the example illustrated, such segments 482 collapse well before other portions of to the portion 440' collapse. In one implementation, the other portions of to the portion 440' do not collapse or collapse to a de minimus extent such that opposite internal walls of such portions do not contact or are not pressed against one another. Because only segments 482 have a reduced wall thickness or have a more collapsible material, the other portions of to the portion 440' may be made from more durable materials or may be provided with greater wall thickness, providing greater support in durability. As shown by FIG. 11, segments 482A collapse to close the end openings of tubular portion 440, reducing the need for plugs. Segments 482B collapse adjacent to circuit chip 444 to form a compartment or chamber about circuit chip 444 so as to retain circuit chip 444 in a predefined position.

Figure 12:
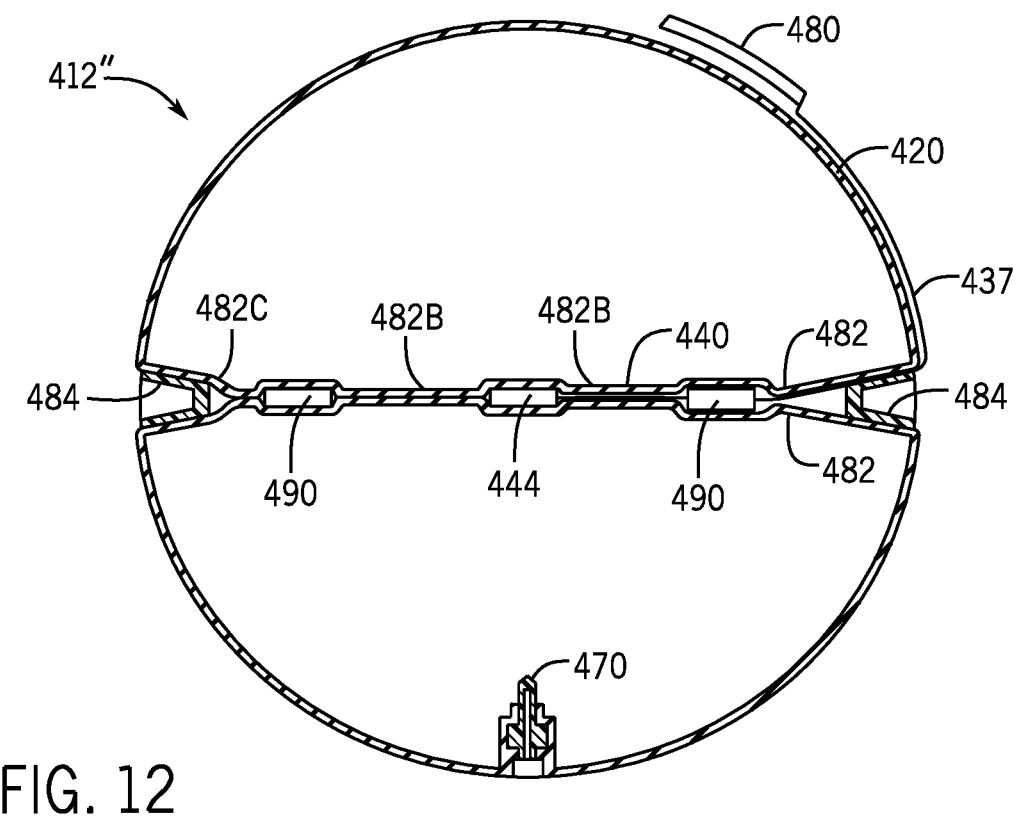
FIG. 12 is a sectional view of a portion of another implementation of the ball of FIG. 8.

FIG. 12 illustrates basketball 400 comprising bladder 412", another implementation of bladder 412. Bladder 412" is similar to bladder 412' is at the bladder 412" comprises tubular portion 440". Tubular portion 440" is similar to tubular portion 440' except that tubular portion 440" omits segments 482A, but comprises segments 482C and plugs 484. Segments 482C of tubular portion 440" are configured to collapse prior to any collapse of the remaining portions of tubular portion 440" (excluding other segments 482). Segments 482C can cooperate with segments 482B to form multiple discrete space chambers 490 along a length of to the portion 440", wherein segments number 482 retain any components within such compartments in place. In some implementations, segments 482 provide water moisture impermeable seals.

Plugs 484 close or occlude and openings of tubular portion 440" to provide a uniform circumferential surface along the exterior bladder 412". In other implementations, plugs 484 or segments 483 may be omitted. In other implementations, bladder 412" may have other numbers of segments 482 to form or define a greater or fewer of such compartments 490.

Figure 13:
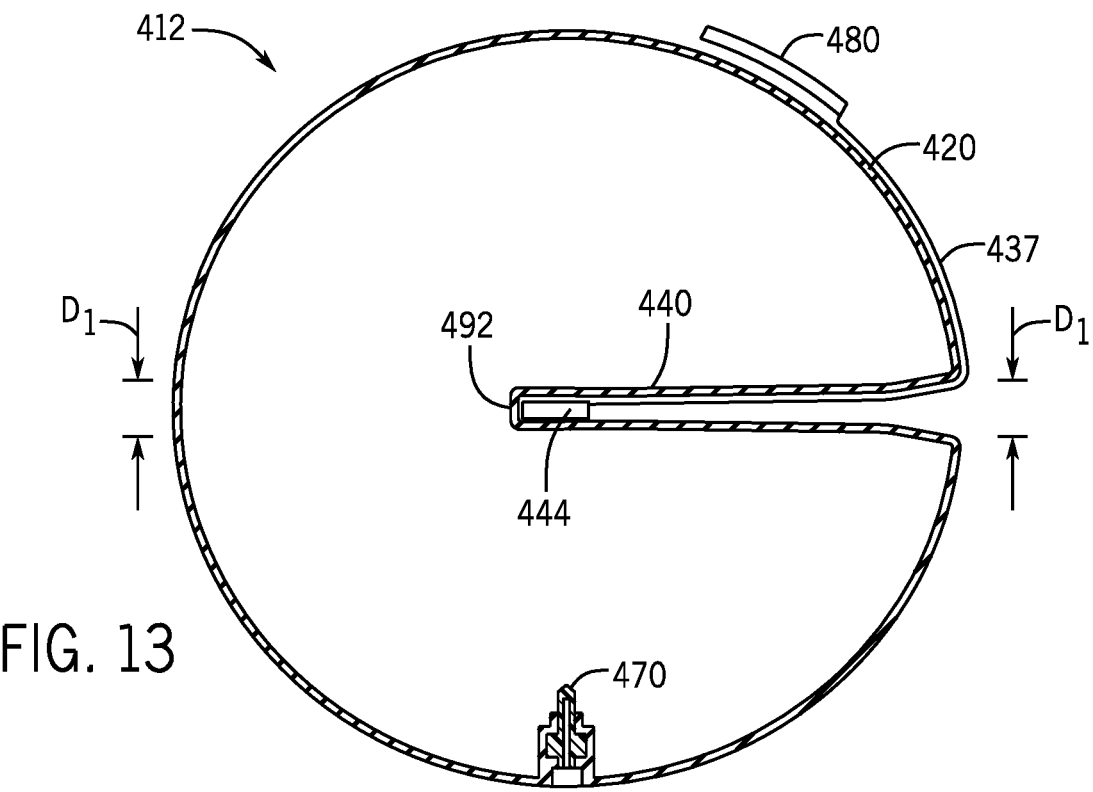
FIG. 13 is a sectional view of a portion of another implementation of the ball of FIG. 8.
Figure 14:
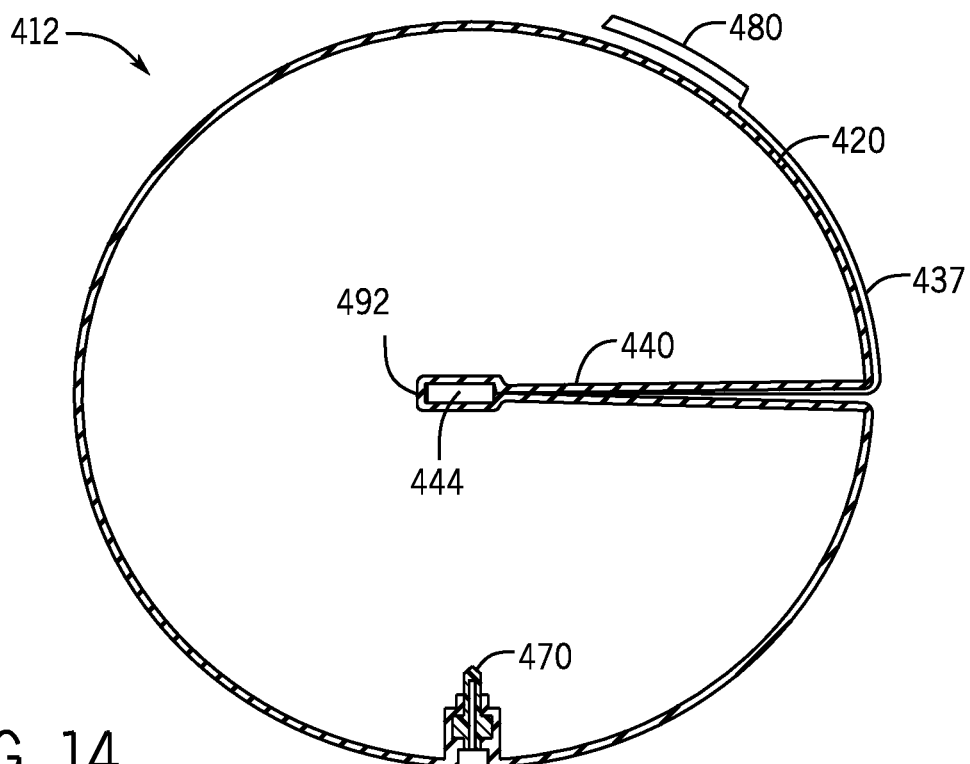
FIG. 14 is a sectional view of a portion of another implementation of the ball of FIG. 8.

FIGS. 13 and 14 are sectional views illustrating another example implementation of basketball 400. In the implementation of FIGS. 12 and 13, the tubular portion 440 comprises a flexible tubing extending into an interior of bladder 412, terminating at a blind or closed off end 492. As a result, outer wall 420 and tubular portion 440 form and inflatable interior which encircles tubular portion 440 in which extend across an end of tubular portion 440. Tubular portion 440 is sized receive electronic components, such as circuit chip 444 (described above).

FIGS. 13 and 14 illustrate bladder 412 in two different inflation states. FIG. 13 illustrates bladder 412 in an uninflated or partially inflated state while FIG. 14 illustrates bladder 412 in a greater inflation state wherein bladder 412 has a greater internal air pressure. As shown by FIG. 13, when bladder 412 is in the uninflated or partially inflated state, tubular portion 440 has an enlarged internal diameter D1 which facilitates insertion of circuit chip 444 into tubular portion 440. The internal surface of end 492 of tubular portion 440 serves as a stop surface for locating circuit chip 444. As a result, by precisely controlling the interior of end portion 492, the positioning of circuit chip 444 may also be precisely located in controlled. In one implementation, end portion 492 is located at a center point of bladder 412 of basketball 400 such that electronics or circuit chip 444 is positioned at a center point of bladder 412 and of basketball 400. In one implementation, circuit chip 444 is inserted into tubular portion 440 while electrical leads or wires 437 remain connected to circuit chip 444 and extend from circuit chip 444 out of tubular portion 440 for connection to electronics 480 or other devices along an exterior of bladder 412. In another implementation, wires 437 and/or electronics 480 can be omitted. In one implementation, the enlarged internal diameter of tubular portion 440 facilitates pushing of circuit chip 444 into the interior of tubular portion 440 with a push rod or other push device. In another implementation, the As shown by FIG. 14, when bladder 412 is more fully inflated, tubular portion 440, under the increased pressure resulting from the increased internal pressure of bladder 412, collapses about circuit chip 444 and about electrical line 437. To facilitate such a collapse, tubular portion 440 can be formed from one or more materials and/or has one or more appropriate wall thicknesses that cause such a collapse in response to bladder 412 being more fully inflated as compared to when circuit chip 444 was inserted into tubular portion 440. In the example illustrated, tubular portion 440 is configured (using materials and material wall thickness) such that tubular portion 440 collapses about circuit chip 444 prior to bladder 412 being inflated above or beyond a maximum recommended in use inflation pressure for bladder 412 and for basketball 400.

Because tubular portion 440 collapses about circuit chip 444, tubular portion 440 retains circuit chip 444 in place without the use of welding, adhesives, glues or other affixing mechanisms or materials. In one implementation, tubular portion 440 collapses about circuit chip 444 to such an extent so as to form a water or moisture impermeable seal about circuit chip 444, protecting circuit chip 444 from such water or moisture. In the example illustrated, substantially the entirety of tubular portion 440 collapses. In such implementations, because the end opening of tubular portion 440 is substantially closed along or adjacent to outer wall 420, plugs or other seals may be omitted.

In another implementation, the tubular portion 440 of FIG. 13 can be formed of a rigid or substantially rigid material forming a continuous passage or tube through a portion of the bladder 412. The chip 444 can be inserted within the tubular portion 440 to the end 492 and secured to the rigid or substantially rigid tubular portion 440 through an adhesive or other fastening means, such as for example, press fit connections, plugs, etc.

FIGS. 15 through 18E illustrate other alternative implementations of bladder 412 of basketball 400. Bladder 412 comprises at least one panel 916 having end portions 917 joined along an exterior seam 918 (shown in FIG. 16). Bladder 412 is specifically illustrated as further comprising support 922. In the example shown, bladder 412 is formed from two or more panels 916 having end portions 917 joined along seams 918 on opposite sides of bladder 412. In another implementation, bladder 412 is formed from a single panel 916 having end portions 917 joined along a single seam 918. In yet another implementation, bladder 412 is formed from panels having end or edge portions joined along multiple seams 918. In other implementations, one or more of such seams 918 may be turned inwardly.

Because bladder 412 is formed from one or more single or multilayered sheets or panels 916, bladder 412 more easily supports electronic support 922. As shown by FIG. 16, in one implementation, electronic support 922 comprises a cross-member 982 extending within bladder 412. As shown by FIG. 18, in one implementation, electronic support 922 additionally comprises cover member 984 which cooperates with cross-member 982 to form a compartment, chamber or pocket 986 which receives circuit chip 444 and contains circuit chip 444 or a weight or other mass element. In other implementations, circuit chip 444 may alternatively be welded, bond, adhered, fastened or otherwise attached to a face of cross-member 982, omitting cover member 984.

As shown by FIG. 18A, the electronic chip 444 and the pocket 986 are positioned on a cross-member 982 longitudinally extending across the bladder 412. The cross-member 982 can be a planar, single or multi-layered sheet of material used to support the electronic chip 444 within the internal volume of bladder 412. In one particularly preferred embodiment, the cross-member 982 is a sheet that is bonded, preferably through RF welding, between first and second panels or sheets 916 of the bladder 412. The cross-member 982 thereby becomes part of the bladder seam 987, which provides generally uniform structural support to the cross-member 982. The cross-member 82 can be formed of a mixture of vinyl and polyester urethane. The mixture can be new material or a regrind of such materials. Alternatively, it can be formed of vinyl, other urethanes, fabric, a thermoplastic, other polymeric materials, rubber and combinations thereof. In implementations where electronic chip 444 comprises one or more light emitters 452, cross-member 982 is formed from one or more translucent or transparent materials and/or includes openings there through allowing emitted light to pass through cross-member 982.

The cross-member 982 provides support to the electronic chip 444 in two dimensions across a plane. The uniform support provided by the bladder seam 97 enables the electronic chip 444 to be supported in the single plane. The material of the cross-member 982 and the tightness, tautness, or tension created during the formation of the bladder 412 can be varied to produce the desired operating position for the electronic chip 918. A stiffer, more rigid and/or higher tensioned material forming the cross-member 982 can be used to inhibit movement of the electronic chip 444 during play. In one preferred embodiment the cross-member 982 has a thickness of at least 0.004 inch, has an ultimate tensile strength of at least 3000 psi and has an ultimate elongation of at least 250 percent. In a particularly preferred embodiment, the cross-member has a thickness of at least 0.005 inch, an ultimate tensile strength of at least 7000 psi and an ultimate elongation of at least 400 percent.

In one implementation, the cross-member 982 can include one or more openings 988 for allowing air within the bladder 412 to move freely from one side of the cross-member 982 to the other, and to readily equalize within the bladder during use. Without the openings 988, the further pressurized air cannot communicate with the volume of air on the opposite side of the cross-member to equalize the pressure within basketball 400. The pressure difference can have a negative effect on the dribbling and performance of the basketball 400. The openings 984 eliminate this issue by allowing for pressure to readily equalize throughout the internal volume of the bladder 412 following an impact.

Referring to FIG. 18A, the cross-member 982 supports the electronic chip 444 longitudinally and laterally about a plane defined by the cross-member 982. The cross-member 982 and the bladder seam 987 define the four symmetrically spaced openings 988.

The cross-member 982 can be formed of a very rigid and/or taut material inhibiting movement of the electronic chip 918 during movement of the basketball 400 and following impacts to the cover panels 320 of the basketball 400. Accordingly, when the bladder 412 within the basketball 400 is inflated to the recommended operating pressure range, the bladder 412 expands under the pressure. The expansion of the bladder 412 and the bladder seam 987 can render the cross-member taut and applies a tensile load to the cross-member 982 to keep the cross-member 982 in a taut position. The inflation of the bladder 412 to the recommended operating pressure can place a tensile load onto the cross-member 982. Additionally, the inflation of the bladder 412 to the recommended operating pressure can also cause the cross-member 982 to elongate in one or more direction depending upon the points of attachment of the cross-member 982 to the bladder side walls at the bladder seam 988. The elongation of the cross-member 982 is preferably within the range of 10 to 300 percent in at least one direction about the cross-member 982. In alternative embodiments, the cross-member 982 can be formed of a flexible material that more readily absorbs impacts during use.

Figure 18B:
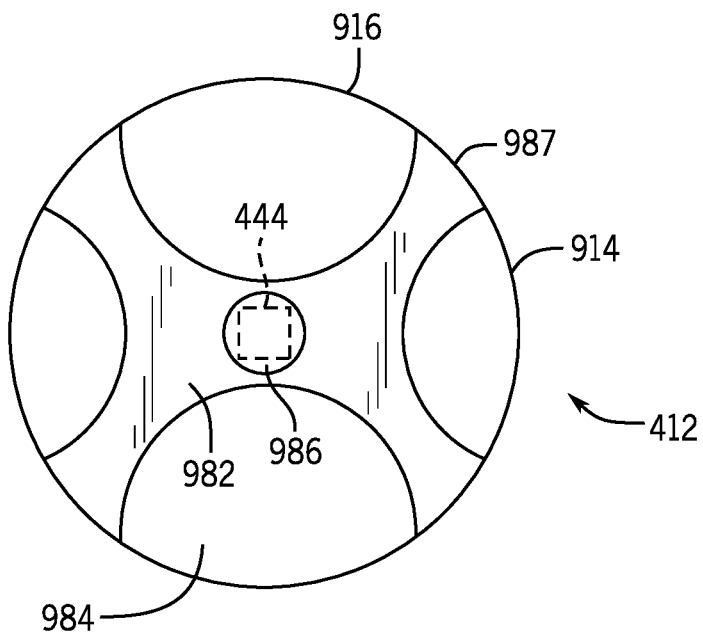
FIG. 18B is a sectional view of another example implementation of the ball of FIG. 15 taken along line 18A-18A.
Figure 18C:
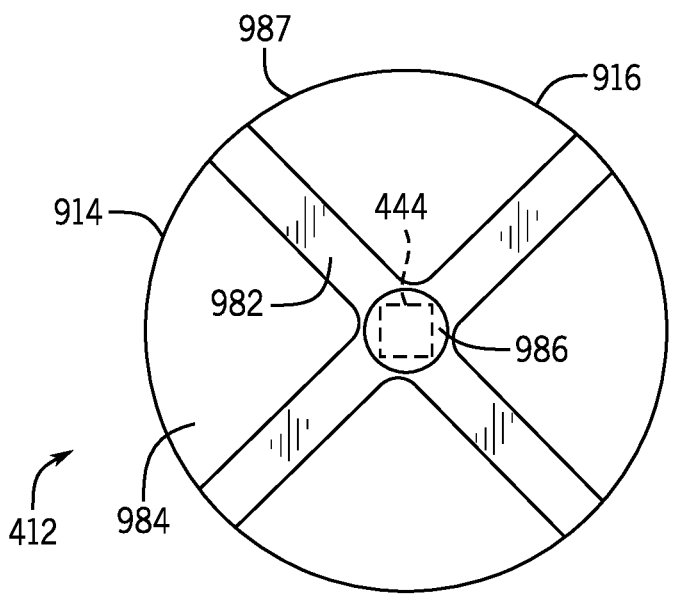
FIG. 18C is a sectional view of another example implementation of the ball of FIG. 15 taken along line 18A-18A.

Referring to FIGS. 18B and 18C, two alternative implementations of the cross-member 982 within the bladder 412 are shown. In each embodiment, the openings 984 are defined by the cross-member 982 and the bladder seam 987. In each embodiment, the electronic chip 444 or weight is supported bi-directionally about the plane defined by the cross-member 982 and the bladder seam 988. In implementations where electronic chip 444 comprises one or more light emitters 452, cross-member 982 is formed from one or more translucent or transparent materials and/or includes openings there through allowing emitted light to pass through cross-member 982.

Figure 18D:
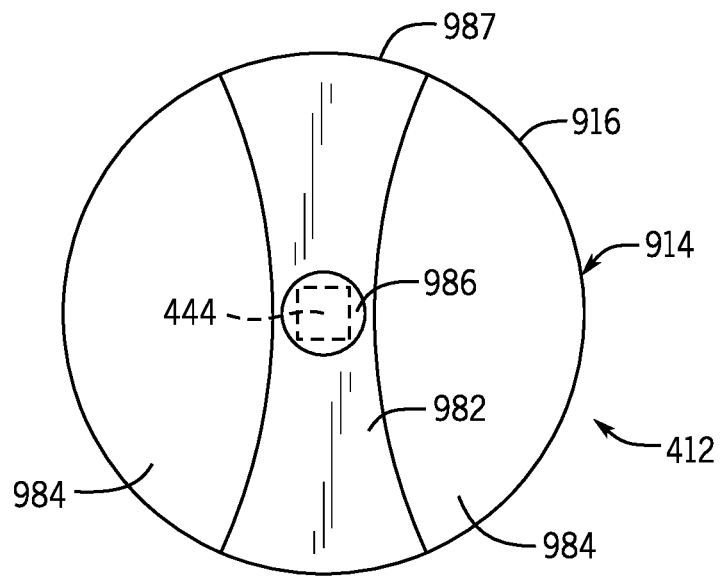
FIG. 18D is a sectional view of another example implementation of the ball of FIG. 15 1 taken along line 18A-18A.
Figure 18E:
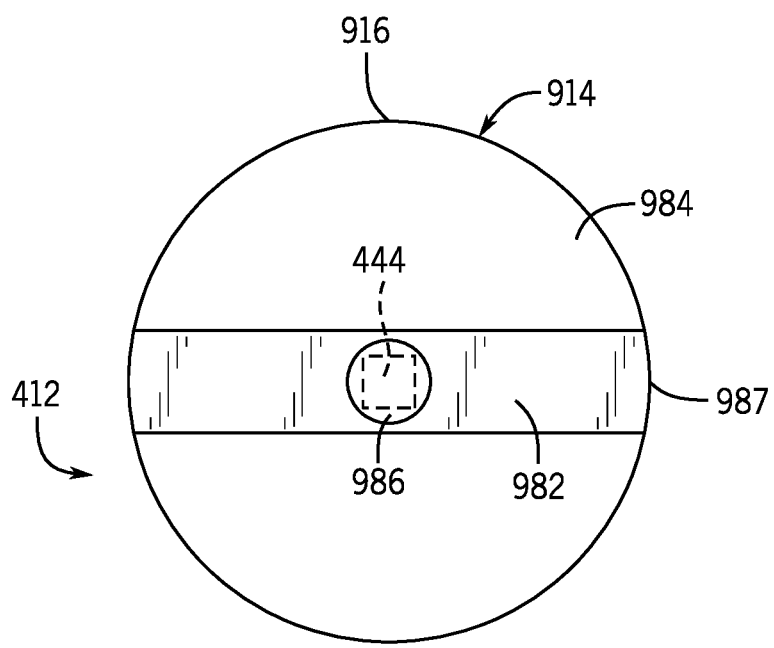
FIG. 18E is a sectional view of another example implementation of the ball of FIG. 15 taken along line 18A-18A.

Referring to FIGS. 18D and 18E, two additional alternative implementations of the cross-member 982 within the bladder 412 are shown. In FIG. 18D, the cross-member 982 extends laterally or transversely across the internal volume of the bladder 412. In FIG. 18E, the cross-member 982 extends longitudinally across the internal volume of the bladder 412. In each embodiment, the cross-member 982 and the bladder seam 98 define two large openings 984. In other alternative preferred embodiments, the cross-member 982 can be formed of a plurality of threads, cords, wires, strings, springs, straps, bands, sheets or combinations thereof that support the electronic chip 444 within the bladder 412. In implementations where electronic chip 444 comprises one or more light emitters 452, cross-member 982 is formed from one or more translucent or transparent materials and/or includes openings there through allowing emitted light to pass through cross-member 982.

Figure 19:
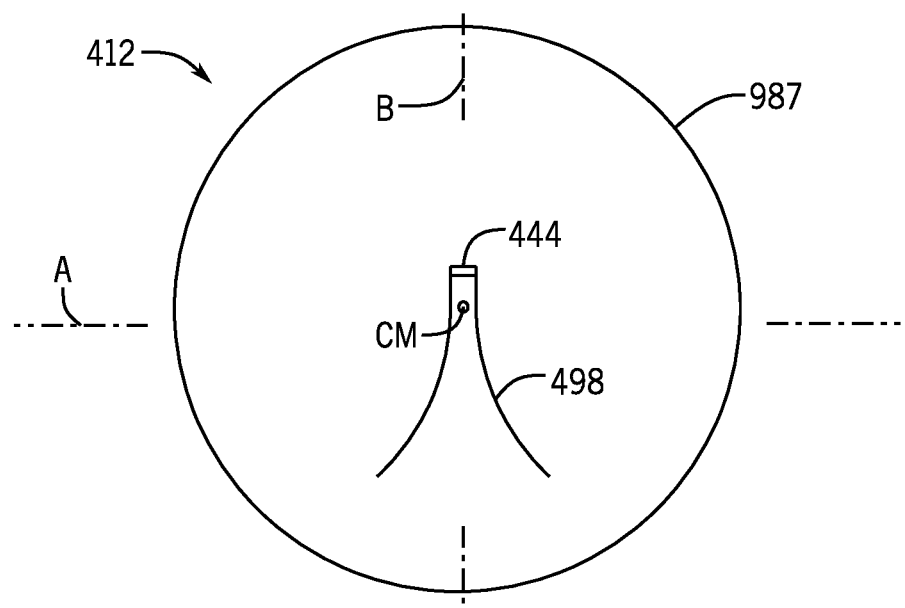
FIG. 19 is a sectional view of another example implementation of the basketball of FIG. 15.
Figure 20:
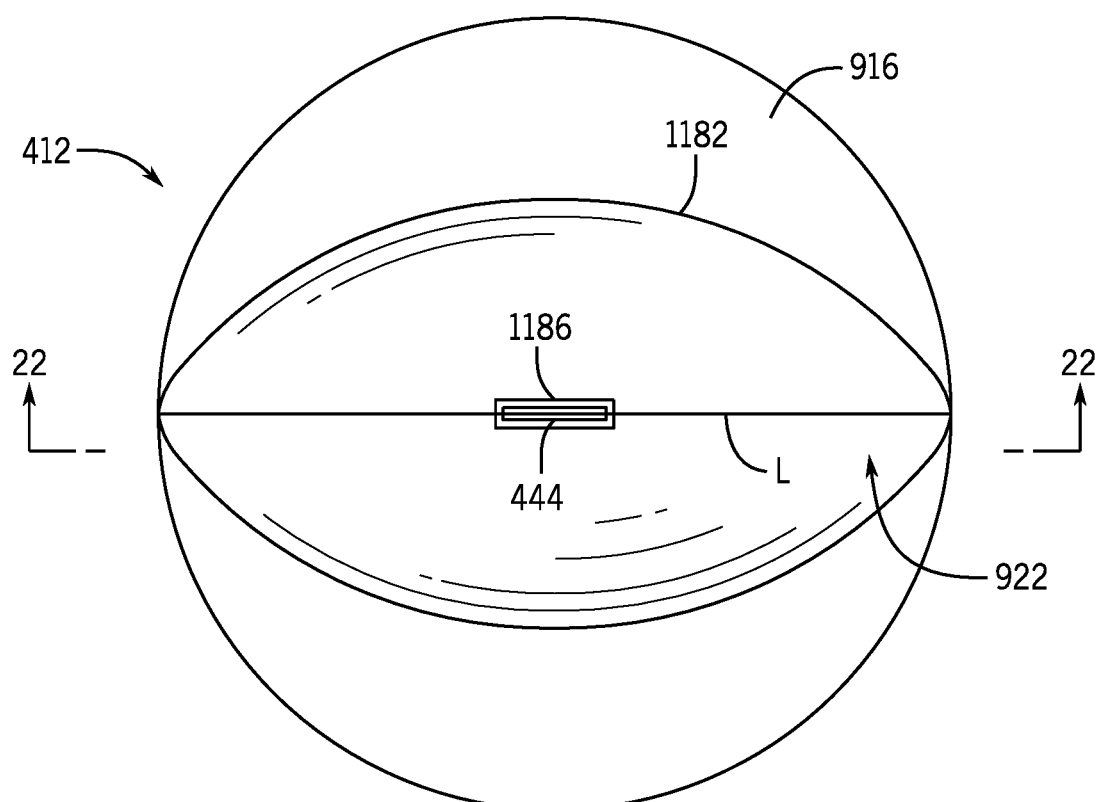
FIG. 20 is a sectional view of another example implementation of the ball of FIG. 15.

FIG. 19 illustrates a portion another implementation of basketball 400. Basketball 400 is specifically illustrated as supporting circuit chip 444 with a tower 498. As shown by FIG. 20, electronic chip 444 is supported by a tower 498 extending within the interior of bladder 412. In the example shown, bladder 412 comprises an internal tower 498 supporting chip 444. In one implementation, tower 498 comprises a resiliently flexible structure welded, bonded, fused or integrally formed as part of the outer walls of bladder 412 and projecting into or towards a center of bladder 412. In the example illustrated, tower 498 widens at its base for greater stability. In other implementations, tower 93 may have other configurations. For example, the tower can be a narrow cylindrical structure. In other implementations, tower 498 may be rigid.

In the example illustrated, tower 498 extends beyond the axis A of bladder 412. Tower 498 extends beyond axis A by a sufficient distance such that, given the mass of chip 444 and the mass of tower 498, tower 498 and chip 444 do not alter a balance of bladder 412 or the ultimately formed basketball 400. In particular, the entire structure formed by tower 498 and chip 444 has a center of mass CM aligned with axis A and axis B. In other implementations, tower 93 and chip 444 may have a CM at other locations and may have other configurations.

FIG. 20 illustrates another implementation of the basketball 400. The bladder 412 can be formed from six panels 916 joined to one another to form these spherical shape of bladder 412. In other implementations, bladder 412 may be formed from a fewer greater of such panels. The bladder 412 can employ an electronics support 922 formed from at least two cross-members 1182 positioned at opposite ends of the bladder 412. One or more of the cross-members 1182 can include a pocket 1186 for receiving an electronic chip 444 or a weight. In this embodiment, the electronic chip 444 is suspended within the bladder 412 by one of the cross-members 1182 at a position that is the center of the bladder 412.

In other implementations, the thickness and/or density of the one or more of the layers of the basketball can be shifted to further reduce the MOI of the basketball and increase its spin rate. For example, in one implementation, the backing 32 can be formed of nano-fibers. The nano-fibers can be used to reduce the weight or mass of the cover panels 22. In another implementation, less urethane can be applied to or be positioned within the backing 32 of the cover panels 18 to decrease their weight.

Referring to FIG. 21, another implementation of the present invention is illustrated in which a basketball 500 is formed without strips 24 of the basketball 10. The basketball 500 is substantially the same as the basketball 10 except that in lieu of the strips 24, the layer of elastomeric material 16 can be molded in the carcass forming mold to produce a series of ridges 524 outwardly extending from the elastomeric material at the same locations of the strips 24 of the basketball 10. The ridges 524 include an outer surface 528.

In one implementation, the outer surface can include a pebbled texture. In another implementation, the outer surface 528 can have a convex or concave curvature to facilitate contact with a player's fingertips.

Referring to FIG. 22, another implementation of the present invention is illustrated in which a basketball 600 is formed without strips 24 of the basketball 10. The basketball 600 is substantially the same as the basketball 10 except that in lieu of the strips 24, the layer of elastomeric material 16 can be molded in the carcass forming mold to produce thickened regions 640 and a series of grooves 624 inwardly extending into the elastomeric material at the thickened regions. The grooves can have the same locations of the strips 24 of the basketball 10. The grooves 624 include an outer surface 628. In one implementation, the outer surface can include a pebbled texture. In another implementation, the outer surface 628 can have a convex or concave curvature to facilitate contact with a player's fingertips.

Many embodiments of the basketballs 10, 200, 300 and 400 built in accordance with the present application are specifically configured for providing optimum performance in all levels of competitive, organized play. For example, many embodiments of the basketballs built in accordance with the present application fully meet the basketball rules and/or requirements of one or more of the following basketball organizations: the Basketball Rules of the National Federation of State High School Associations ("NFHS"); the Basketball Rules and Interpretations of the National Collegiate Athletic Association ("NCAA"); and the Official Basketball Rules of the Federation International de Basketball Amateur ("FIBA"). Accordingly, the term "basketball configured for organized, competitive play" refers to a basketball that fully meets the basketball rules and/or requirements of, and is fully functional for play in, one or more of the above listed organizations.

While the preferred embodiments of the present invention have been described and illustrated, numerous departures therefrom can be contemplated by persons skilled in the art. Therefore, the present invention is not limited to the foregoing description but only by the scope and spirit of the appended claims.

What is claimed is:

1. A game ball for organized, competitive play and having a total mass, comprising:
   an inflatable, bladder having a bladder mass that is greater than 25 percent of the total mass;
   a layer of reinforcing material surrounding the bladder;
   an elastomeric layer surrounding the bladder, the elastomeric layer and the layer of reinforcing material having a collective mass that is less than 55 percent of the total mass; and
   a plurality of cover panels positioned over the layer of reinforcing material and the elastomeric layer, the game ball being formed without one or more of electronics, batteries and charging coils.

2. The game ball of claim 1, wherein the game ball is a size 7 basketball.

3. The game ball of claim 2, wherein the game ball has a moment of inertia less than 54.0 kg/cm$^2$.

4. The game ball of claim 2, wherein the game ball has a moment of inertia less than 53.0 kg/cm$^2$.

5. The game ball of claim 1, wherein the bladder mass is at least 30% of the total mass.

6. The game ball of claim 1, wherein the bladder mass is at least 35% of the total mass.

7. The game ball of claim 5, wherein the collective mass is less than 50% of the total mass.

8. The game ball of claim 6, wherein the collective mass is less than 45% of the total mass.

9. The game ball of claim 1, wherein the total mass is within the range 566 to 625 grams.

10. The game ball of claim 1, wherein the total mass is within the range of 580 to 605 grams.

11. The game ball of claim 1, wherein the density of the bladder is greater than 1.125.

12. The game ball of claim 1, further comprising a weight positioned at the center of the inflatable spherical bladder.

13. The game ball of claim 12, wherein the weight has a mass within the range of 5 to 25 grams.

14. The game ball of claim 12, wherein the bladder further includes internal structure for supporting the weight within the bladder.

15. The game ball of claim 14, wherein the internal structure is a tube inwardly extending from a wall of the bladder.

16. The game ball of claim 14, wherein the internal structure is a cross-member extending across the internal volume of the bladder.

17. The game ball of claim 1, wherein the bladder includes a bladder wall, and wherein the bladder wall has a thickness of at least 0.9 mm.

18. The game ball of claim 1, wherein the elastomeric layer is formed of a sponge rubber compound.

19. The game ball of claim 18, wherein the sponge rubber compound includes a foaming agent, wherein the foaming agent represents at least 2.5 percent of the weight of the rubber compound prior to curing of the rubber compound.

20. The game ball of claim 1, wherein the plurality of cover panels including a backing layer.

\* \* \* \* \*